(12) United States Patent
Otani et al.

(10) Patent No.: US 11,531,854 B2
(45) Date of Patent: Dec. 20, 2022

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventors: Ryosuke Otani, Tokyo (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/934,486

(22) Filed: Jul. 21, 2020

(65) Prior Publication Data

US 2020/0349405 A1    Nov. 5, 2020

Related U.S. Application Data

(63) Continuation of application No. PCT/JP2019/002485, filed on Jan. 25, 2019.

(30) Foreign Application Priority Data

Jan. 26, 2018  (JP) .............................. JP2018-011493
Jan. 15, 2019  (JP) .............................. JP2019-004549

(51) Int. Cl.
   *G06K 15/02*    (2006.01)
   *G06K 15/10*    (2006.01)

(52) U.S. Cl.
   CPC ....... *G06K 15/1872* (2013.01); *G06K 15/102* (2013.01)

(58) Field of Classification Search
   CPC .......................... G06K 15/1872; G06K 15/102
   (Continued)

(56) References Cited

U.S. PATENT DOCUMENTS 9,201,839 B2   12/2015  Hara et al.
9,462,091 B2   10/2016  Hara et al.
(Continued)

FOREIGN PATENT DOCUMENTS

JP   H11308461 A    11/1999
JP   2007006391 A    1/2007
(Continued)

OTHER PUBLICATIONS

International Search Report issued by the Japan Patent Office dated Mar. 26, 2019 in corresponding International Application No. PCT/JP2019/002485, with English translation.

(Continued)

*Primary Examiner* — Quang N Vo
(74) *Attorney, Agent, or Firm* — Carter, DeLuca & Farrell LLP

(57) ABSTRACT

An image processing apparatus that generates image data to be output to an image forming apparatus printing an image, and includes: a generation unit configured to generate, based on an input image, first generation amount data indicating a generation amount of each of one or more kinds of ink dot for each pixel and second generation amount data indicating a generation amount of a blank dot for which the ink dot is not formed for each pixel; and a processing unit configured to determine a dot arrangement pattern indicating an arrangement of each of the one or more kinds of ink dot by performing quantization processing using the first generation amount data and the second generation amount data.

21 Claims, 22 Drawing Sheets

(58) Field of Classification Search
USPC .......................................... 358/1.2, 1.9, 1.15
See application file for complete search history.

(56) References Cited

U.S. PATENT DOCUMENTS

| | | | |
|---|---|---|---|
| 9,485,388 B2 | 11/2016 | Kodama et al. | |
| 9,690,228 B2 | 6/2017 | Otani | |
| 9,734,439 B2 | 8/2017 | Hara et al. | |
| 9,749,496 B2 | 8/2017 | Fujimoto et al. | |
| 10,027,848 B2 | 7/2018 | Fuse | |
| 10,043,118 B2 | 8/2018 | Sumi et al. | |
| 10,057,459 B2 | 8/2018 | Yamamoto et al. | |
| 10,063,743 B2 | 8/2018 | Fuse et al. | |
| 10,073,370 B2 | 9/2018 | Takikawa et al. | |
| 10,187,553 B2 | 1/2019 | Takesue et al. | |
| 10,194,053 B2 | 1/2019 | Otani et al. | |
| 10,356,282 B2 | 7/2019 | Ochiai et al. | |
| 10,545,446 B2 | 1/2020 | Takikawa et al. | |
| 10,733,488 B2 | 8/2020 | Takesue et al. | |
| 2012/0229549 A1* | 9/2012 | Shibata .................. | H04N 1/405 347/15 |
| 2013/0128286 A1* | 5/2013 | Tamagawa ............. | H04N 1/605 358/1.2 |
| 2015/0220824 A1* | 8/2015 | Kikuta ............... | G06K 15/1872 358/3.05 |
| 2015/0371124 A1* | 12/2015 | Okumura ........... | H04N 1/40081 358/1.9 |
| 2019/0156164 A1 | 5/2019 | Yanai et al. | |
| 2019/0362202 A1 | 11/2019 | Kikuta et al. | |
| 2020/0079102 A1 | 3/2020 | Ochiai et al. | |
| 2020/0156386 A1 | 5/2020 | Otani et al. | |
| 2020/0171820 A1 | 6/2020 | Takesue et al. | |
| 2020/0184289 A1 | 6/2020 | Takesue et al. | |
| 2020/0198365 A1 | 6/2020 | Ochiai et al. | |
| 2020/0204705 A1 | 6/2020 | Hashioka et al. | |
| 2020/0247137 A1 | 8/2020 | Otani et al. | |

FOREIGN PATENT DOCUMENTS

| | | |
|---|---|---|
| JP | 2012-186714 A | 9/2012 |
| JP | 2015150869 A | 8/2015 |
| WO | 9803341 A1 | 1/1998 |

OTHER PUBLICATIONS

Office Action issued by the Japanese Patent Office dated Oct. 11, 2022 in corresponding JP Patent Application No. 2019-004549, with English translation.

* cited by examiner

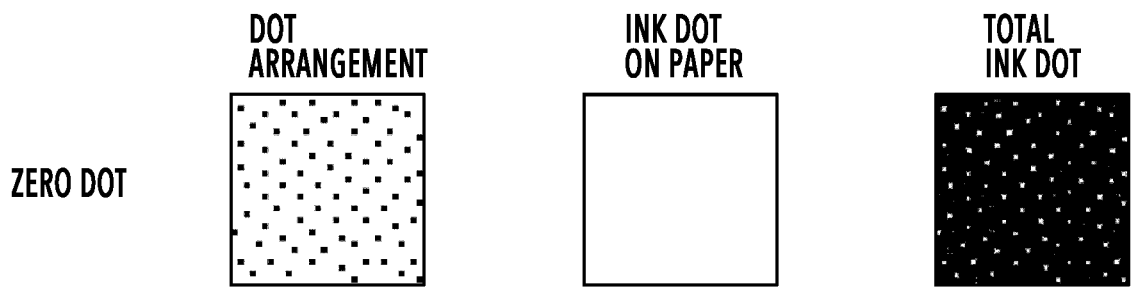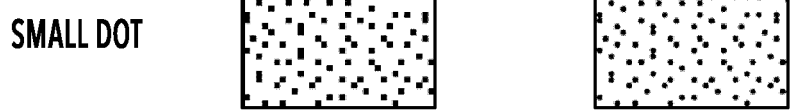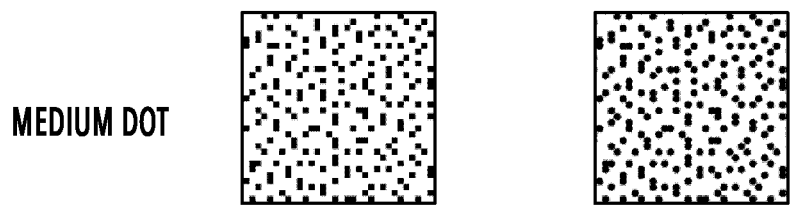

| E_K_large (1) | E_K_large (2) | E_K_large (3) | ... | E_K_large (W) | E_K_large (W+1) |

FIG.8A

| E_K_medium (1) | E_K_medium (2) | E_K_medium (3) | ... | E_K_medium (W) | E_K_medium (W+1) |

FIG.8B

| E_K_small (1) | E_K_small (2) | E_K_small (3) | ... | E_K_small (W) | E_K_small (W+1) |

FIG.8C

| E_K_zero (1) | E_K_zero (2) | E_K_zero (3) | ... | E_K_zero (W) | E_K_zero (W+1) |

FIG.8D

| E_P123 (1) | E_P123 (2) | E_P123 (3) | ... | E_P123 (W) | E_P123 (W+1) |

FIG.10A

| E_P12 (1) | E_P12 (2) | E_P12 (3) | ... | E_P12 (W) | E_P12 (W+1) |

FIG.10B

| E_P1 (1) | E_P1 (2) | E_P1 (3) | ... | E_P1 (W) | E_P1 (W+1) |

FIG.10C

 LARGE DOT
 MEDIUM DOT
 SMALL DOT
 ZERO DOT
 LARGE DOT
 MEDIUM DOT
 SMALL DOT
 ZERO DOT
OPTIMUM ARRANGEMENT IN TOTAL OF MEDIUM, SMALL, ZERO DOTS
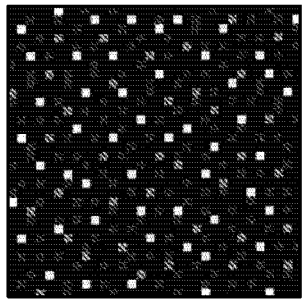
OPTIMUM ARRANGEMENT IN TOTAL OF LARGE, MEDIUM, SMALL DOTS
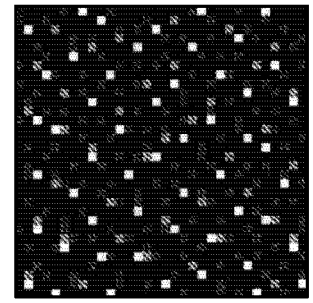
FIG.11A
FIG.11B

IMAGE PROCESSING APPARATUS, IMAGE PROCESSING METHOD AND STORAGE MEDIUM

CROSS-REFERENCE TO RELATED APPLICATIONS

This application is a Continuation of International Patent Application No. PCT/JP2019/002485, filed Jan. 25, 2019, which claims the benefit of Japanese Patent Application Nos. 2018-011493 filed Jan. 26, 2018 and 2019-004549 filed Jan. 15, 2019, all of which are hereby incorporated by reference herein in their entirety.

BACKGROUND OF THE INVENTION

Field of the Invention

The present invention relates to quantization processing to convert the number of tones of an input image into a smaller number of tones for forming an image by using a color material represented by ink and the like.

Background Art

Conventionally, as a technique to print an image processed by a computer or the like in a multi-color and multi-tone manner, an image forming apparatus that forms an image on a printing medium, such as paper, by forming dots by a color material, such as ink, is used widely. For the image forming apparatus such as this, aiming at improvement of the printing speed and high image quality, a variety of methods relating to dot arrangement control have been proposed. For example, Patent Literature 1 has disclosed a technique to cause dots of deep and light inks to be highly dispersive by determining the dot arrangement in order from the ink whose density is the highest in an ink jet printing apparatus using inks whose density is different for the same color. Further, Patent Literature 2 has disclosed a technique to determine the dot arrangement so that the arrangement of each dot whose formable size is different becomes highly dispersive in total.

CITATION LIST

Patent Literature

Patent Literature 1: International Publication No. WO98/03341
Patent Literature 2: Japanese Patent Laid-Open No. 2007-6391

In Patent Literatures 1 and 2 described above, the arrangement of dots for which ink is ejected is determined by performing quantization processing by the error diffusion method for the multi-valued ink value data corresponding to a plurality of kinds of dots. In these conventional techniques, the pixel corresponding to the paper white portion to which no ink is ejected is determined as a portion in which any dot is not arranged. As a result of that, for example, in Patent Literature 1, although a high dispersity is obtained for dots of the deep ink and the light ink, respectively, there is a case where the dispersity is not good for the paper white portion, which is not the control target. Further, in Patent Literature 2, although a high dispersity is obtained in the dot arrangement in total of each of the large, medium, and small dots, there is a case where a sufficient dispersity is not obtained on the whole including the paper white portion. In a case where attention is focused on the pixel corresponding to the paper white portion as described above, it happens sometimes that a good granularity is not implemented by the conventional technique and the image quality deteriorates.

The present invention has been made in view of the above-described problem and an object is to enable quantization processing capable of obtaining a better granularity.

SUMMARY OF THE INVENTION

The image processing apparatus according to the present invention is an image processing apparatus that generates image data to be output to an image forming apparatus printing an image by an ink dot formed by ejecting ink onto a printing medium, and includes: a generation unit configured to generate, based on an input image, first generation amount data indicating a generation amount of each of one or more kinds of ink dot for each pixel and second generation amount data indicating a generation amount of a blank dot for which the ink dot is not formed for each pixel; and a processing unit configured to determine a dot arrangement pattern indicating an arrangement of each of the one or more kinds of ink dot by performing quantization processing using the first generation amount data the second generation amount data.

Further features of the present invention will become apparent from the following description of exemplary embodiments with reference to the attached drawings.

BRIEF DESCRIPTION OF THE DRAWINGS

FIG. 5A to FIG. 5I are diagrams explaining effects in a case where arrangement of blank dots is determined with priority in a dark tone.

FIG. 8A to FIG. 8D are each a diagram showing an example of an error line buffer.

FIG. 10A to FIG. 10C are each a diagram showing an example of an error line buffer.

FIG. 11A and FIG. 11B are diagrams explaining effects of quantization processing by a method of the second embodiment.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment (Configuration of Printing System)

Figure 1A:
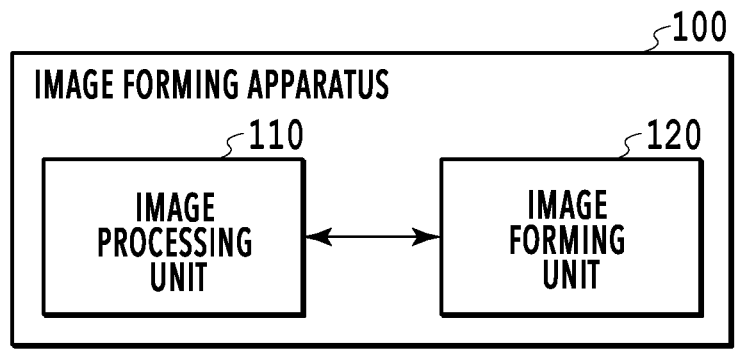
FIG. 1A is a diagram showing an example of a configuration of an image forming apparatus and FIG. 1B is a block diagram showing a main hardware configuration of an image processing unit.

FIG. 1A is a diagram showing an example of the configuration of an image forming apparatus that performs printing by the ink jet method according to the present embodiment. An image forming apparatus 100 of the present embodiment includes an image processing unit 110 and an image forming unit 120. Upon receipt of printing instructions of a user, the image processing unit 110 generates dot arrangement data corresponding to n kinds of dot (in the present embodiment, three kinds of dot, that is, large, medium, and small dots) for each ink color and the image forming unit 120 performs printing based on the dot arrangement data.

Figure 1B:
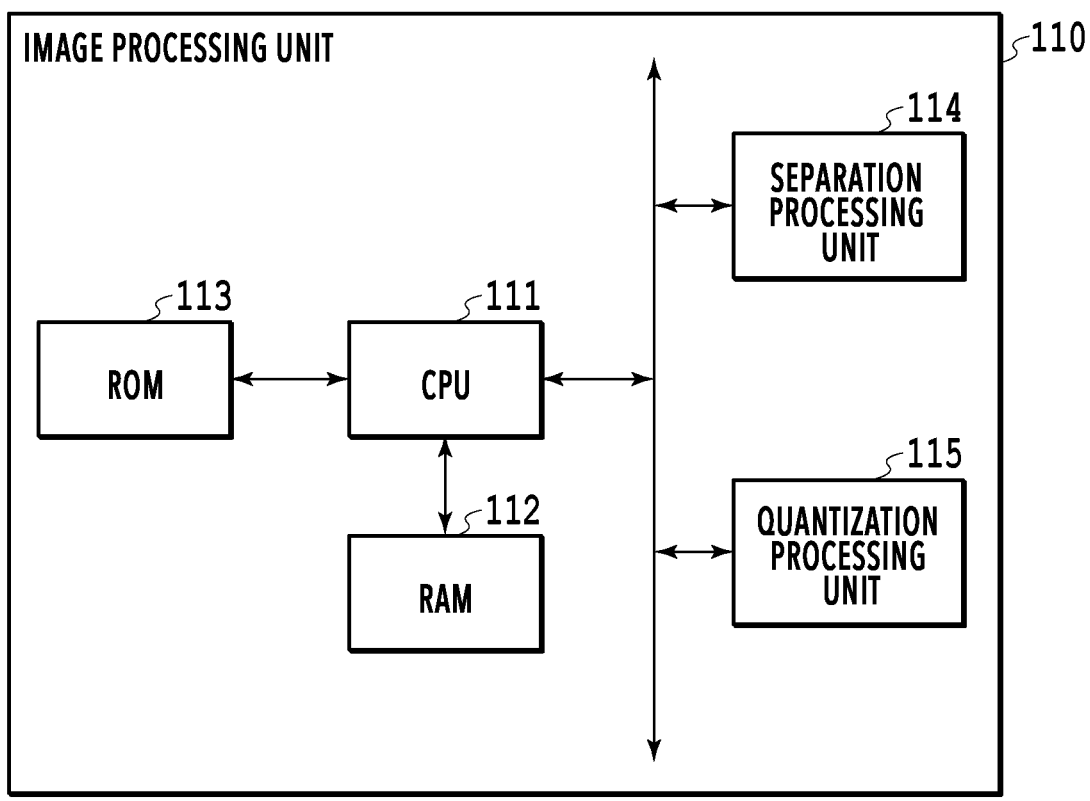

FIG. 1B is a block diagram showing the main hardware configuration of the image processing unit 110. The image processing unit 110 includes a CPU 111, a RAM 112, a ROM 113, a separation processing unit 114, and a quantization processing unit 115. The CPU 111 centralizedly controls the entire image processing unit 110 based on programs stored in the ROM 113. The RAM 112 is used as a work area of the CPU 111. The separation processing unit 114 generates (n (n is an integer not less than 1 and in the present embodiment, n=3)+1) pieces of dot generation amount data on each ink color from printing-target input image data. The dot generation amount data is data in which a value indicating tone information is saved for each pixel. The quantization processing unit 115 performs quantization processing (halftone processing) by using the (n+1) pieces of dot generation amount data input from the separation processing unit 114 and generates n pieces of dot arrangement data on each ink color, which are represented by a smaller number of tones. Each piece of dot arrangement data is data in which information indicating whether or not a dot is arranged is saved for each pixel. Details of the separation processing unit 114 and the quantization processing unit 115 will be described later. The above-described two processing units (separation processing unit 114 and quantization processing unit 115) configuring the image processing unit 110 are enabled to perform high-speed processing by configuring them by logic circuits. The image processing unit 110 may include components other those described above, such a processing unit configured to perform y correction and a processing unit configured to perform color matching, but they are not the main purpose of the present invention, and therefore, explanation is omitted. Further, it may also be possible to configure the image processing unit 110 as an apparatus independent of the image forming apparatus, for example, such as a general personal computer. In this case, by a printer driver installed in the apparatus, the functions of the above-described image processing unit 110 may be implemented.

The image forming unit 120 prints an image on a printing medium, such as paper, by using color materials in, for example, four colors of CMYK (cyan, magenta, yellow, black). Although the printing method of an image is not limited in particular, in the present embodiment, explanation is given by taking the ink jet method as an example. In a case of the ink jet method, an image is formed by ejecting ink droplets in each color from a line head on which nozzle columns provided for each color of CMYK are arranged side by side. The line head is, for example, a long head (also called a page-wide head or a full-line type head) comprising a nozzle array covering the entire range of a drawing area in the width direction perpendicular to the sheet conveyance direction. In a case of the long head, the long head is arranged so as to extend in the direction substantially perpendicular to the sheet conveyance direction and by relatively moving a sheet once (single-pass method) or a plurality of times (multi-pass method) with respect to the head, an image with a predetermined resolution is formed. Within the nozzle of the line head, a piezo element is provided and the amount of ink to be ejected from an opening of the nozzle is adjusted by the voltage to be applied to the piezo element. A variety of types of ink head exist and it is needless to say that the long head is an example and the head is not limited to the long head.

In the present embodiment, the image forming unit 120 is configured to as to be capable of forming dots of three different sizes in each color of CMYK. In the present specification, the dot that is formed by ink being ejected actually from the nozzle is collectively referred to as "actual dot (or ink dot)" and the dot is called "large dot", "medium dot", and "small dot" in order from the dot whose amount of ejected ink is the largest. By four kinds of dot, that is, the actual large, medium, and small dots plus a dot for which no ink is ejected from the nozzle, that is, whose amount of ejection is zero, it is made possible to represent four density levels in one nozzle. In the present specification, the dot corresponding to the paper white portion, which is formed by ejecting no ink, is called "blank dot (or zero dot)". The head that ejects ink is not limited to the piezo ejection method and it may also be possible to adopt the thermal ejection method. With the thermal ejection method, it is possible to design a configuration in which ink at three different density levels can be ejected by comprising a plurality of line heads whose amount of ejection is different from one another.

(Separation Processing Unit and Quantization Processing Unit)

Figure 2:
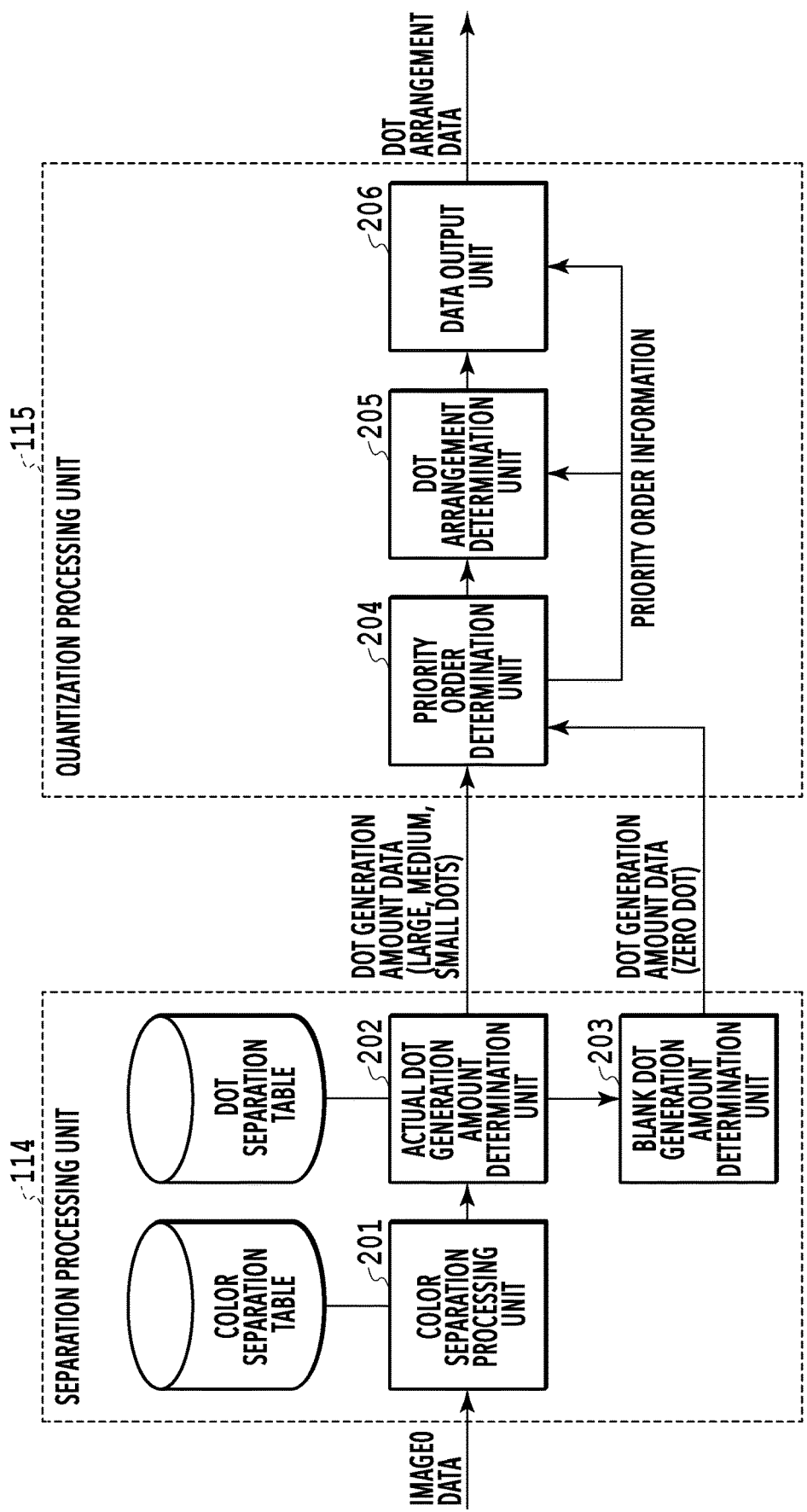
FIG. 2 is a functional block diagram showing an internal configuration of a separation processing unit and a quantization processing unit according to a first embodiment.
Figure 3:
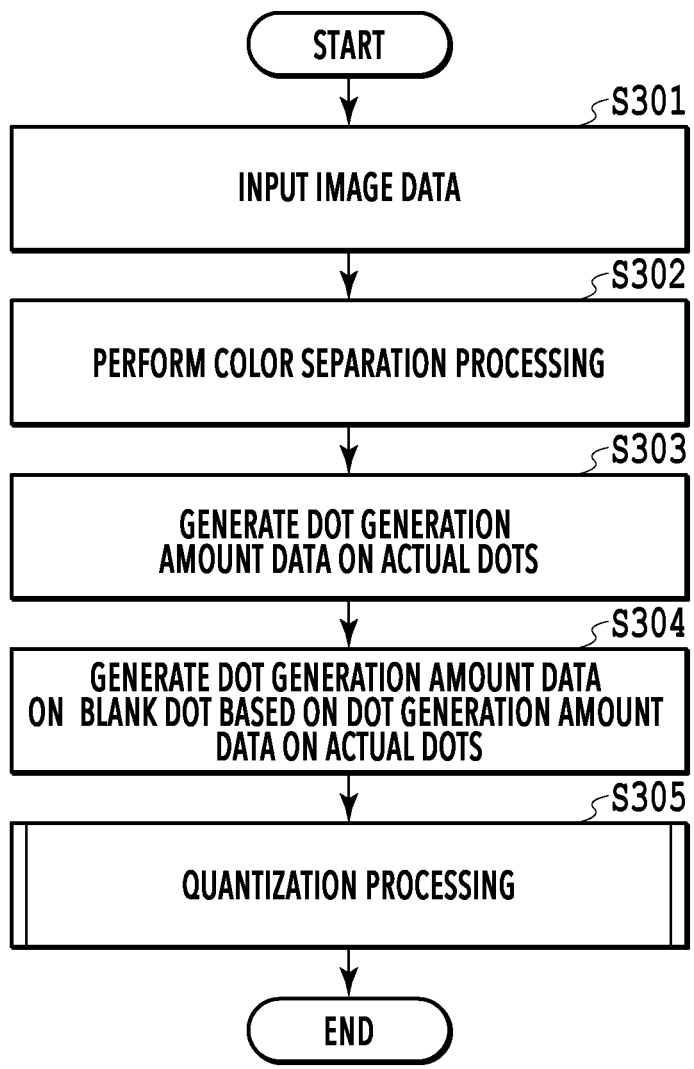
FIG. 3 is a flowchart showing a flow of processing within the image processing unit according to the first embodiment.

Following the above, the separation processing unit 114 and the quantization processing unit 115, which are features of the present embodiment, are explained in detail. FIG. 2 is a functional block diagram showing the internal configuration of the separation processing unit 114 and the quantization processing unit 115. As shown in FIG. 2, the separation processing unit 114 has a color separation processing unit 201, an actual dot generation amount determination unit 202, and a blank dot generation amount determination unit 203. Further, the quantization processing unit 115 has a priority order determination unit 204, a dot arrangement determination unit 205, and a data output unit 206. In the following, explanation is given along the flowchart shown in FIG. 3. In the following explanation, symbol "S" represents a step.

At S301, printing-target image data received by the image forming apparatus 100 from an external information processing apparatus (not shown schematically) or the like is input to the color separation processing unit 201 of the separation processing unit 114. This input image data is, for example, multi-valued RGB image data in which three color components of red (R), green (G), and blue (B) are represented in, for example, 256 tones. At S302 that follows, the color separation processing unit 201 performs color separation processing for the RGB image data by using a color separation table prepared in advance and converts the RGB image data into image data for each of CMYK corresponding to each ink plane (image plane corresponding to each ink color of CMYK). The obtained image data for each of CMYK (hereinafter, also described collectively as CMYK image data) is sent to the actual dot generation amount determination unit 202.

Figure 4:
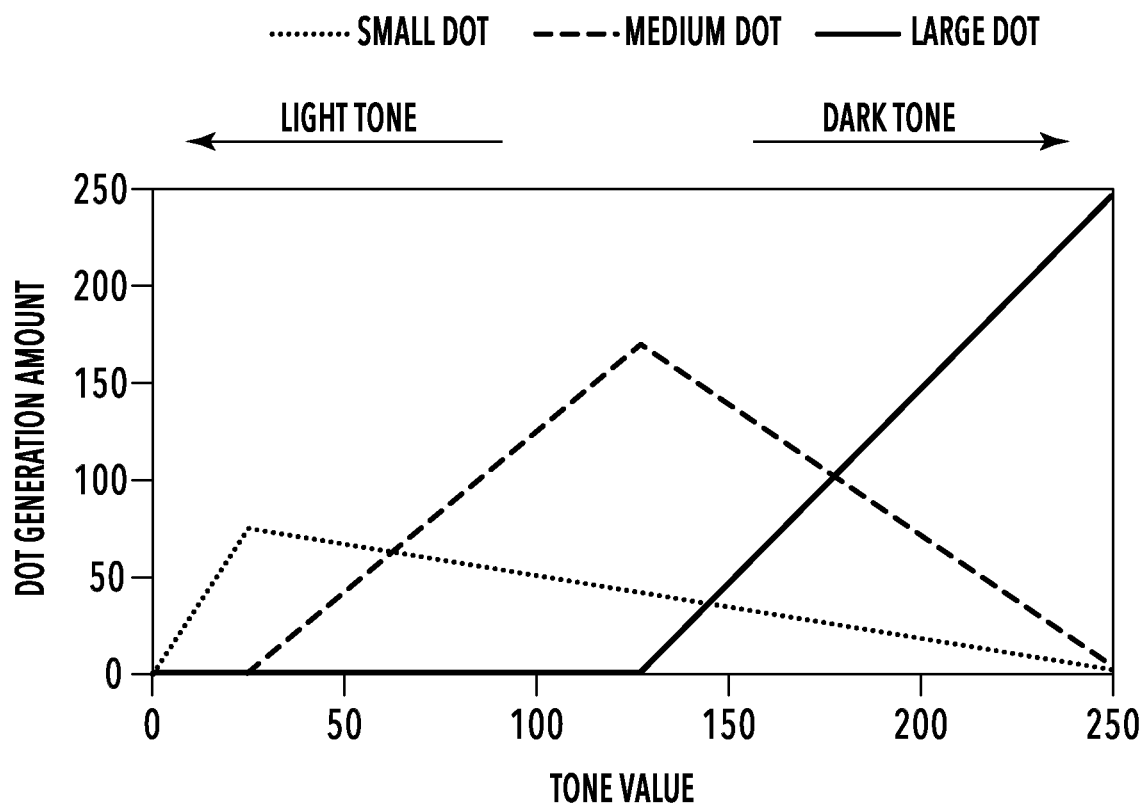
FIG. 4 is a diagram showing an example of a dot separation table according to the first embodiment.

At step 303, the actual dot generation amount determination unit 202 acquires dot generation amount data for each size of the large, medium, and small dots by performing dot size separation processing for each piece of CMYK image data by using a dot separation table prepared in advance. Specifically, the actual dot generation amount determination unit 202 separates the image plane corresponding to each color of CMYK into data (each dot plane of large, medium, and small dots) for each actual dot of the large, medium, and small dots whose ink ejection amount is different, which corresponds to one dot. FIG. 4 is a diagram showing an example of the dot separation table according to the present embodiment. The horizontal axis represents the tone value in the image plane corresponding to each ink color after the color separation processing and the vertical axis represents the generation amount (ratio of dots formed per unit area) for each actual dot of the large, medium, and small dots. In a case of FIG. 4, the maximum value of both the vertical axis and the horizontal axis is 255. The dot separation table such as this is prepared and stored in advance, for example, for each color of CMYK, and read and referred to at this step. For example, it is assumed that FIG. 4 is the dot separation table of cyan and the tone value in the cyan image plane (C plane) is "200". In this case, in the C plane, the generation amount of the large dot is "145", the generation amount of the medium dot is "75", and the generation amount of the small dot is "18". In this manner, for the C plane, data C_large indicating the generation amount of the large dot, data C_medium indicating the generation amount of the medium dot, and data C_small indicating the generation amount of the small dot are generated. For magenta, yellow, and black, similar dot generation amount data is generated. That is, for the M plane, M_large, M_medium, and M_small, for the Y plane, Y_large, Y_medium, and Y_small, and for the K plane, K_large, K_medium, and K_small are generated. The data (a total of 12 dot planes) indicating the generation amounts of the actual large, medium, and small dots for each of CMYK thus generated is sent to the quantization processing unit 115.

At S304, the blank dot generation amount determination unit 203 generates dot generation amount data on the blank dot for each image plane of CMYK. In the present embodiment, an input image is represented by combining the three kinds of actual dot, that is, the large, medium, and small dots, in accordance with the tone value in each color of CMYK. Consequently, the theoretical maximum value of the total of the dot generation amounts of the three kinds of actual dot in each pixel is 255. Because of this, it is possible to regard the difference between the maximum value 255 and the total of the dot generation amounts of the three kinds of actual dot as the tone value (corresponding to the generation amount) to be represented by the blank dot. Consequently, data C_zero, M_zero, Y_zero, and K_zero each indicating the blank dot generation amount in each image plane of CMYK is expressed by formula (1) to formula (4) below, respectively.

$$C\_zero = 255 - (C\_large + C\_medium + C\_small) \quad \text{formula (1)}$$

$$M\_zero = 255 - (M\_large + M\_medium + M\_small) \quad \text{formula (2)}$$

$$Y\_zero = 255 - (Y\_large + Y\_medium + Y\_small) \quad \text{formula (3)}$$

$$K\_zero = 255 - (K\_large + K\_medium + K\_small) \quad \text{formula (4)}$$

The data (zero dot plane) indicating the blank dot generation amount in each color obtained as described above is sent to the quantization processing unit 115. Then, by using the dot generation amount data on the four kinds (large, medium, and small dots plus zero dot) for each of CMYK, at next S305, the dot arrangement of each color of CMYK is determined. In the present embodiment, in the dark tone (shadow area), control is performed so that the arrangement of the blank dot is determined prior to the arrangement of the actual large, medium, and small dots. A low dispersity of the dot arrangement of the paper white portion visually conspicuous in the dark tone will be a factor that deteriorates the granularity. Because of this, by determining the blank dot arrangement with priority in the dark tone over the actual dot arrangement, a high dispersity is secured. The method of the present embodiment aims at improvement of the granularity by also generating the dot generation amount data on the blank dot corresponding to the paper white portion and determining the blank dot arrangement with priority over the actual dot arrangement.

At S305, the quantization processing unit 115 generates dot arrangement data by performing the quantization processing based on the four kinds (large, medium, and small dots plus zero dot) of dot generation amount data for each of CMYK. At this time, the priority order is determined for the above-described four kinds of dot and the dot arrangement is determined sequentially in order from the dot whose priority order is the highest. FIG. 5A to FIG. 5I are diagrams explaining effects in a case where the blank dot arrangement is determined with priority in the dark tone. FIG. 5A to FIG. 5D each show an arrangement example of each dot in a case where the blank dot arrangement is determined with priority. Here, the tone value "200" is taken as an example. FIG. 5A is the blank dot arrangement, FIG. 5B is the small dot arrangement, FIG. 5C is the medium dot arrangement, and FIG. 5D is the large dot arrangement. In FIG. 5A, the blank dot is a pixel for which no ink is ejected originally, but here, to explicitly indicate the dot arrangement, the position at which the blank dot is arranged is indicated by the black dot. In FIG. 5B to FIG. 5D also, as in FIG. 5A, the position at which each dot is arranged is indicated by the black dot of the same size. From FIG. 5A, it is known that the dispersity is high because the blank dot arrangement is determined with priority over the arrangement of the other actual dots. On the other hand, from FIG. 5B to FIG. 5D, the arrangement of the actual large, medium, and small dots is determined so as to be exclusive of the blank dot, and therefore, the dispersity is deteriorated compared to a case where the arrangement of each dot is determined with priority. FIG. 5E to FIG. 5H are each an image diagram in a case where ink dots are formed on a sheet with each dot alone based on the dot arrangement in FIG. 5A to FIG. 5D. As regards the blank dot, the ink ejection amount is zero, and therefore, no dot is formed (FIG. 5E). As regards the small dot, the medium dot, and the large dot, ink is ejected in each corresponding amount of ejection and the actual dots are formed (FIG. 5F, FIG. 5G FIG. 5H). FIG. 5I is an image diagram in a case where the actual large, medium, and small dots are formed on the same sheet based on the dot arrangement in FIG. 5A to FIG. 5D. The arrangement of the blank dot is determined with priority, and therefore, it is known that the dispersity of the dot arrangement in the visually conspicuous paper white portion is high and the image whose granularity is good is obtained. Details of the quantization processing will be explained in detail by using another flowchart.

(Details of Quantization Processing)

Figure 6:
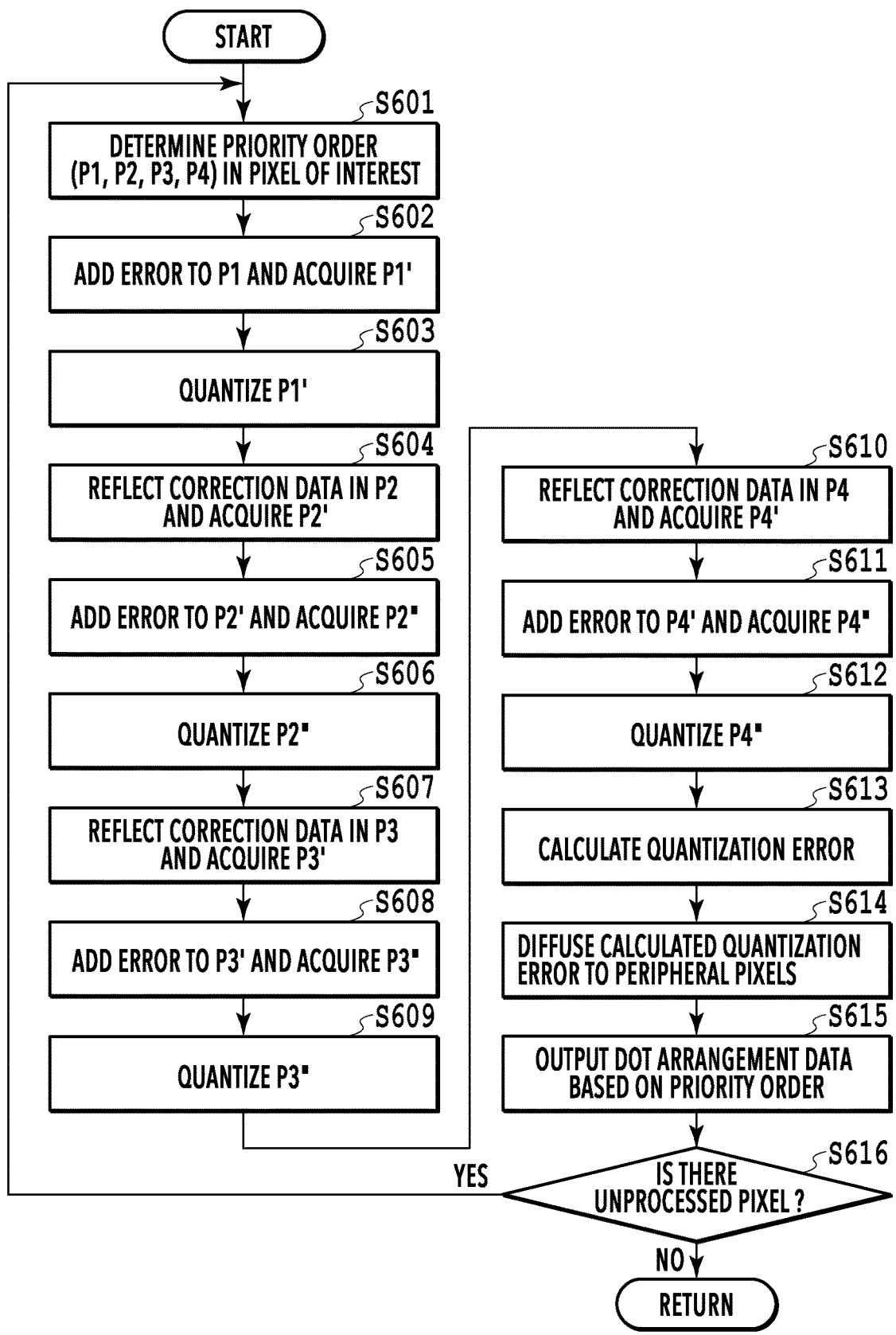
FIG. 6 is a flowchart showing details of quantization processing according to the first embodiment.

Following the above, details of the quantization processing at S305 are explained along the flowchart in FIG. 6. This processing is the same for each color of CMYK, and therefore, in the following, explanation is given by taking black (K) as a representative example. Further, in the following, explanation is given by taking a case as an example where the dot generation amount data is converted into binary dot arrangement data by quantizing the dot generation amount data by the error diffusion method, but the method of quantization is not limited to the error diffusion method and for example, the dither method may be used. In the following explanation, symbol "S" represents a step.

At S601, the priority order determination unit 204 sets an unprocessed pixel in the K plane as the pixel of interest and for the pixel of interest, determines the priority order for the above-described four kinds (large, medium, and small dots plus zero dot) of dot generation amount data generated in the separation processing unit 114. Here, it is assumed that the priority order is represented by P1, P2, P3, and P4 in order from the highest priority order. In this case, in the light tone, the higher the density level of the deep dot (that is, the larger the ink dot), the more conspicuous and in the dark tone, the lower the density level of the light dot (that is, the smaller the dot (zero dot)), the more conspicuous. Consequently, it is desirable to give a higher priority order to the dot that is more conspicuous in the tone. Here, as shown in FIG. 4, in general, in the dark tone, the large dot generation amount is increased and the paper white portion is reduced. Therefore, by comparing the generation amount of the large dot and the generation amount of the blank dot, which are determined in accordance with the tone value, it is possible to determine whether the tone is the light tone or the dark tone. Further, the smaller the number of dots, the higher the degree of freedom of the dot arrangement is, and it is possible to determine the arrangement so as to be highly dispersive. Consequently, by comparing the dot generation amount data on each dot and determining the priority order so that the dots whose number is smaller is given a higher priority, it is possible to effectively improve the dispersity in the arrangement of the conspicuous dot. Based on the way of thinking as described above, for example, the priority order is determined by the method as in 1), 2), or 3) below.

1) Determination Method Based on Dot Generation Amount Data on Large Dot and Zero Dot First, large dot generation amount data K_large (x, y) and zero dot generation amount data K_zero (x, y), which correspond to a pixel of interest position (x, y), are read and both are compared. In a case where comparison results indicate that K_large (x, y)<K_zero (x, y), it is determined that the pixel of interest belongs to the light tone and the priority order in the pixel of interest is determined as P1=K_large, P2=K_medium, P3=K_small, and P4=K_zero. On the other hand, in a case where K_large (x, y)≥K_zero (x, y), it is determined that the pixel of interest belongs to the dark tone and the priority order in the pixel of interest is determined as P1=K_zero, P2=K_small, P3=K_medium, and P4=K_large.

2) Determination Method Based on Only Dot Generation Amount Data on Large Dot

First, the large dot generation amount data corresponding to the pixel of interest position (x, y) is referred to. Then, in a case where K_large (x, y)=0, it is determined that the pixel of interest belongs to the light tone and the priority order in the pixel of interest is determined as P1=K_large, P2=K_medium, P3=K_small, and P4=K_zero. On the other hand, in a case where K_large (x, y)>0, it is determined that the pixel of interest belongs to the dark tone and the priority order in the pixel of interest is determined as P1=K_zero, P2=K_small, P3=K_medium, and P4=K_large.

3) Determination Method Based on Dot Generation Amount Data on Large, Medium, Small, and Zero Dots The large, medium, and small dots generation amount data corresponding to the pixel of interest position (x, y) is referred to. Then, the priority order in the pixel of interest is determined as P1, P2, P3, and P4 in order from the smallest dot generation amount data. For example, in a case where K_large (x, y)<K_zero (x, y)<K_small (x, y)<K_medium (x, y), the priority order is determined as P1=K_large, P2=K_zero, P3=K_small, and P4=K_medium.

By either of the determination methods in 1) and 2) described above, it is possible to give priority to the blank dot arrangement for the pixel of interest belonging to the dark tone. Further, by the determination method in 3) also, it is possible to effectively improve the dispersity in the dot arrangement of the conspicuous dot by determining the priority order so that the dots whose number of dots is smaller is given a higher priority.

Here, explanation is continued on the assumption that the pixel of interest belongs to the dark tone and P1=K_zero, P2=K_small, P3=K_medium, and P4=K_large are determined. The information on the priority order (hereinafter, priority order information) thus determined is referred to by the dot arrangement determination unit 205 and the data output unit 206. Explanation of FIG. 6 is returned.

Figure 7:
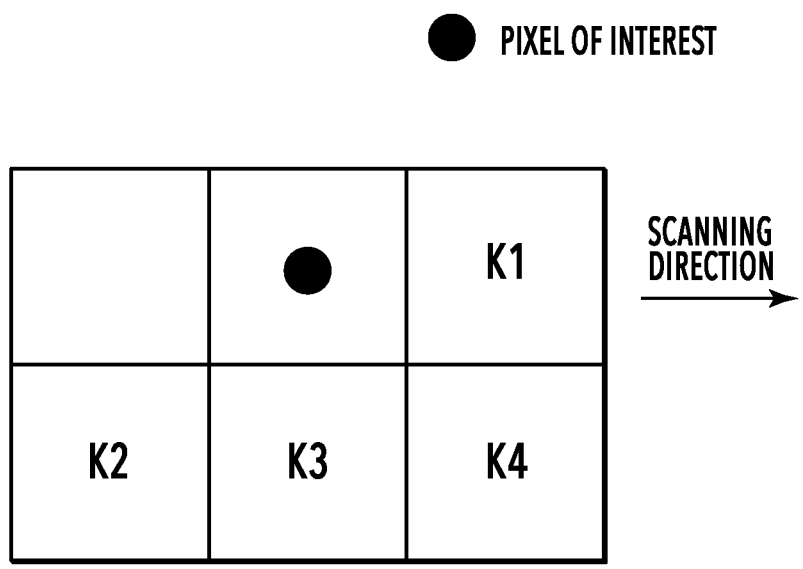
FIG. 7 is an explanatory diagram of error diffusion coefficients.

At S602 and S603 that follow, the dot arrangement determination unit 205 determines the dot arrangement by performing the quantization processing by the error diffusion method for the dot generation amount data (here, K_zero) on P1 whose priority order is the highest based on the priority order information. FIG. 7 shows an example of coefficients to be used at the time of diffusing errors to the peripheral pixels by the error diffusion method. In the present embodiment, it is assumed that there are four coefficients K1 to K4 and for example, K1=7/16, K2=3/16, K3=5/16, and K4=1/16. It is needless to say that the above-described error diffusion coefficients are an example and the example is not limited to this. In order to diffuse and accumulated errors by the error diffusion coefficients such as those, the dot arrangement determination unit 205 comprises (n+1)

error line buffers corresponding to the (n+1) kinds of dot, that is, n kinds of actual dots (here, n=3 because of large, medium, and small dots) plus the blank dot. By having the error line buffer corresponding to each kind of dot, it is possible to keep the continuity of the dot pattern for each kind of dot even in a case where the priority order changes. FIG. 8A to FIG. 8D each show an example of the error line buffer of the present embodiment. FIG. 8A is the error line buffer corresponding to the large dot, FIG. 8B is the error line buffer corresponding to the medium dot, FIG. 8C is the error line buffer corresponding to the small dot, and FIG. 8D is the error line buffer corresponding to the blank dot. Each error line buffer has (W (number of horizontal pixels in the input image)+1) storage areas (E_K_large (x), E_K_medium (x), E_K_small (x), and E_K_zero (x), here, x=1 to (W+1)). Then, in each storage area, the quantization error is stored by a method, to be described later. All the error line buffers are initialized by an initial value (=0) or a random value before the start of the processing. Here, it is assumed that each error line buffer is represented by E_P1, E_P2, E_P3, and E_P4 in order from the highest priority order. Here, the priority order is P1=K_zero, P2=K_small, P3=K_medium, and P4=K_large. Consequently, E_P1=E_K_zero, E_P2=E_K_small, E_P3=E_K_medium, and E_P4=E_K_large will result.

At S602, for dot generation amount data P1 (x, y) corresponding to the pixel of interest position (x, y), its corresponding error E_P1 (x) is read from the error line buffer and added thereto. Dot generation amount data P1' after the error is added is expressed by formula (5) below.

$$P1'=P1(x,y)+E\_P1(x) \qquad \text{formula(5)}$$

Then, at S603, quantization by a comparison between P1' and a threshold value Th is performed. In a case where P1' is greater than the threshold value Th, the quantization results are ON (=255) and in a case where P1' is less than or equal to the threshold value Th, the quantization results are OFF (=0). Here, it is assumed that the quantization results for P1' are represented as O_P1. In this manner, in the dark tone, the blank dot arrangement corresponding to P1 is determined with priority over the actual dot arrangement.

Next, at S604 to S606, the dot arrangement determination unit 205 performs quantization processing for the dot generation amount data (here, K_small) on P2 whose priority order is the second highest and determines the dot arrangement.

First, at S604, a correction amount H based on the arrangement determination results of the dot whose priority order is higher (here, the blank dot) is calculated. Then, processing to reflect the obtained correction amount H in dot generation amount data P2 (x, y) corresponding to the pixel of interest position (x, y) is performed. In this case, the correction amount H is expressed by formula (6) below and dot generation amount data P2' after the correction amount H is reflected is expressed by formula (7) below.

$$H=P1(x,y)-O\_P1(x,y) \qquad \text{formula(6)}$$

$$P2'=P2(x,y)+H \qquad \text{formula(7)}$$

By the above-described processing, it is made possible to exclusively obtain the quantization results of the dot (here, small dot) corresponding to P2 for the arrangement of the dot corresponding to P1 whose priority order is higher.

Next, at S605, for the dot generation amount data P2 (x, y) corresponding to the pixel of interest position (x, y), its corresponding error E_P2 (x) is read from the error line buffer and added thereto. Dot generation amount data P2" after the error is added is expressed by formula (8) below.

$$P2''=P2'+E\_P2(x) \qquad \text{formula(8)}$$

Then, at S606, quantization by a comparison between P2" and the threshold value Th is performed. In a case where P2" is greater than the threshold value Th, the quantization results are ON (=255) and in a case where P2" is less than or equal to the threshold value Th, the quantization results are OFF (=0). Here, it is assumed that the quantization results for P2" are represented as O_P2. Next, at S607 to S609, the dot arrangement determination unit 205 performs quantization processing for the dot generation amount data (here, K_medium) on P3 whose priority order is the third highest and determines the dot arrangement.

First, at S607, the correction amount H based on the arrangement determination results of the dots whose priority order is higher (here, the blank dot and the small dot) is updated. Then, processing to reflect the obtained correction amount H in dot generation amount data P3 (x, y) corresponding to the pixel of interest position (x, y) is performed. In this case, the correction amount H after the updating is expressed by formula (9) below and dot generation amount data P3' after the correction amount H is reflected is expressed by formula (10) below.

$$H=H+P2(x,y)-O\_P2(x,y) \qquad \text{formula(9)}$$

$$P3'=P3(x,y)+H \qquad \text{formula(10)}$$

By the above-described processing, it is made possible to exclusively obtain the quantization results of the dot (here, medium dot) corresponding to P3 for the arrangement of the dots corresponding to P1 and P2 whose priority order is higher.

At S608, for the dot generation amount data P3 (x, y) corresponding to the pixel of interest position (x, y), its corresponding error E_P3 (x) is read from the error line buffer and added thereto. Dot generation amount data P3" after the error is added is expressed by formula (11) below.

$$P3''=P3'+E\_P3(x) \qquad \text{formula(11)}$$

Then, at S609, quantization by a comparison between P3" and the threshold value Th is performed. In a case where P3" is greater than the threshold value Th, the quantization results are ON (=255) and in a case where P3" is less than or equal to the threshold value Th, the quantization results are OFF (=0). Here, it is assumed that the quantization results for P3" are represented as O_P3. Next, at S610 to S612, the dot arrangement determination unit 205 performs quantization processing for the dot generation amount data (here, K_large) on P4 whose priority order is the fourth highest and determines the dot arrangement.

First, at S610, the correction amount H based on the arrangement determination results of the dots whose priority order is higher (here, the blank dot, the small dot, and the medium dot) is updated. Then, processing to reflect the obtained correction amount H in dot generation amount data P4 (x, y) corresponding to the pixel of interest position (x, y) is performed. In this case, the correction amount H after the updating is expressed by formula (12) below and dot generation amount data P4' after the correction amount H is reflected is expressed by formula (13) below.

$$H=H+P3(x,y)-O\_P3(x,y) \qquad \text{formula(12)}$$

$$P4'=P4(x,y)+H \qquad \text{formula (13)}$$

By the above-described processing, it is made possible to exclusively obtain the quantization results of the dot (here, large dot) corresponding to P4 for the arrangement of the dots corresponding to P1 to P3 whose priority order is higher.

At S611, for the dot generation amount data P4 (x, y) corresponding to the pixel of interest position (x, y), its corresponding error E_P4 (x) is read from the error line buffer and added thereto. Dot generation amount data P4″ after the error is added is expressed by formula (14) below.

$$P4''=P4'+E\_P4(x) \quad \text{formula (14)}$$

Then, at S612, quantization by a comparison between P4″ and the threshold value Th is performed. In a case where P4″ is greater than the threshold value Th, the quantization results are ON (=255) and in a case where P4″ is less than or equal to the threshold value Th, the quantization results are OFF (=0). Here, it is assumed that the quantization results for P4″ are represented as O_P4. After this, at S613, differences between the values P1″, P2″, P3″, and P4″ before the quantization processing is performed and each of the quantization results O_P1, O_P2, O_P3, and O_P4 are calculated. In a case where the differences calculated here are taken to be ERR_P1, ERR_P2, ERR_P3, and ERR_P4, they are expressed by formula (15) to formula (18) below.

$$ERR\_P1=P1''-O\_P1 \quad \text{formula (15)}$$

$$ERR\_P2=P2''-O\_P2 \quad \text{formula (16)}$$

$$ERR\_P3=P3''-O\_P3 \quad \text{formula (17)}$$

$$ERR\_P4=P4''-O\_P \quad \text{formula (18)}$$

Then, at S614, the calculated errors are diffused to the pixels around the pixel of interest in accordance with the above-described error diffusion coefficients. Specifically, the errors ERR_P1, ERR_P2, ERR_P3, and ERR_P4 in P1 to P4 are stored in each corresponding line buffer as follows.

First, the error ERR_P1 corresponding to P1 is stored in an error line buffer E_K_zero of K_zero as follows because E_P1=E_K_zero.

$$E\_K\_zero(x+1)=E\_K\_zero(x+1)+ERR\_P1\times 7/16 (x<W)$$

$$E\_K\_zero(x-1)=E\_K\_zero(x-1)+ERR\_P1\times 3/16 (x>1)$$

$$E\_K\_zero(x)=E\_K\_zero(W+1)+ERR\_P1\times 5/16 (1<x<W)$$

$$E\_K\_zero(x)=E\_K\_zero(W+1)+ERR\_P1\times 8/16 (x=1)$$

$$E\_K\_zero(x)=E\_K\_zero(W+1)+ERR\_P1\times 13/16 (x=W)$$

$$E\_K\_zero(W+1)=ERR\_P1\times 1/16 (x<W)$$

$$E\_K\_zero(W+1)=0 (x=W)$$

The error ERR_P2 corresponding to P2 is stored in an error line buffer E_K_small of K_small as follows because E_P2=E_K_small.

$$E\_K\_small(x+1)=E\_K\_small(x+1)+ERR\_P2\times 7/16 (x<W)$$

$$E\_K\_small(x-1)=E\_K\_small(x-1)+ERR\_P2\times 3/16 (x>1)$$

$$E\_K\_small(x)=E\_K\_small(W+1)+ERR\_P2\times 5/16 (1<x<W)$$

$$E\_K\_small(x)=E\_K\_small(W+1)+ERR\_P2\times 8/16 (x=1)$$

$$E\_K\_small(x)=E\_K\_small(W+1)+ERR\_P2\times 13/16 (x=W)$$

$$E\_K\_small(W+1)=ERR\_P2\times 1/16 (x<W)$$

$$E\_K\_small(W+1)=0 (x=W)$$

The error ERR_P3 corresponding to P3 is stored in an error line buffer E_K_medium of K_medium as follows because E_P3=E_K_medium.

$$E\_K\_medium(x+1)=E\_K\_medium(x+1)+ERR\_P3\times 7/16 (x<W)$$

$$E\_K\_medium(x-1)=E\_K\_medium(x-1)+ERR\_P3\times 3/16 (x>1)$$

$$E\_K\_medium(x)=E\_K\_medium(W+1)+ERR\_P3\times 5/16 (1<x<W)$$

$$E\_K\_medium(x)=E\_K\_medium(W+1)+ERR\_P3\times 8/16 (x=1)$$

$$E\_K\_medium(x)=E\_K\_medium(W+1)+ERR\_P3\times 13/16 (x=W)$$

$$E\_K\_medium(W+1)=ERR\_P3\times 1/16 (x<W)$$

$$E\_K\_medium(W+1)=0 (x=W)$$

The error ERR_P4 corresponding to P4 is stored in an error line buffer E_K_large of K_large as follows because E_P4=E_K_large.

$$E\_K\_large(x+1)=E\_K\_large(x+1)+ERR\_P4\times 7/16 (x<W)$$

$$E\_K\_large(x-1)=E\_K\_large(x-1)+ERR\_P4\times 3/16 (x>1)$$

$$E\_K\_large(x)=E\_K\_large(W+1)+ERR\_P4\times 5/16 (1<x<W)$$

$$E\_K\_large(x)=E\_K\_large(W+1)+ERR\_P4\times 8/16 (x=1)$$

$$E\_K\_large(x)=E\_K\_large(W+1)+ERR\_P4\times 13/16 (x=W)$$

$$E\_K\_large(W+1)=ERR\_P4\times 1/16 (x<W)$$

$$E\_K\_large(W+1)=0 (x=W)$$

At S615, the data output unit 206 outputs dot arrangement data corresponding to each of the large, medium, and small dots that the line head can form based on the priority order information received from the priority order determination unit 204. Here, in the priority order information, P1=K_zero, P2=K_small, P3=K_medium, and P4=K_large. In this case, as the dot arrangement data for K ink ejection to the pixel of interest position (x, y), the following three pieces of data are output to the image forming unit 120.

Large dot: O_P4 (x, y)
Medium dot: O_P3 (x, y)
Small dot: O_P2 (x, y)

Then, at S616, whether or not the processing for all the pixels of the K plane is completed is determined. In a case where there is an unprocessed pixel, the processing returns to S601, and the next pixel is taken as the pixel of interest and the processing is continued. On the other hand, in a case where the processing of all the pixels is completed, this processing is terminated. The above is the contents of the quantization processing by the method of the present embodiment.

Modification Example

In the present embodiment, explanation is given by premising the configuration in which the four density levels can be represented by one nozzle for each color of CMYK by the four kinds of dot, that is, the actual dots classified into three sizes of the large, medium, and small dots plus the blank dot.

However, it is also possible to apply the present embodiment to an image forming apparatus that performs tone representation by using a plurality of inks having the same hue but different in density (for example, normal ink and light ink) and combining two kinds of ink dot (deep dot and light dot) and the blank dot. In this case, the above-described processing is performed for the three kinds of dot, that is, the actual dots classified into the deep dot and the light dot plus the blank dot, and based on dot generation amount data on the three kinds of dot, that is, the deep dot, the light dot, and the zero dot, and priority order information, the dot arrangement is performed. At this time, the configuration is designed so that the dot generation amount data on the deep and light dots is generated by using a separation table in which the tone value and the dot generation amounts of the two kinds of actual dot, that is, the deep dot and the light dot, are associated with each other in the "actual dot generation amount determination unit". Then, the data indicating the generation amount of the blank dot for each image plane in accordance with the ink color is found based on formula (1) to formula (4) described previously. In this case, for example, for cyan, by taking the dot generation amount of the deep dot to be C_deep and the dot generation amount of the light dot to be C_light, the dot generation amount C_zero of the blank dot is expressed by formula (1)' below.

$$C\_zero = 255 - (C\_deep + C\_light) \quad \text{formula (1)'}$$

In the present embodiment, the paper white portion for which no ink is ejected is regarded as the blank dot and the generation amount data on the blank dot per unit area is generated based on the generation amount data on the actual dots and quantization is performed. By performing quantization by the method such as this, it is possible to take into consideration the arrangement of the blank dot not formed by the color material at the time of obtaining the dot arrangement data on the actual dots different in the density level. Further, for the pixel belonging to the dark tone within the input image, the dot arrangement of the blank dot is determined with the highest priority, and therefore, it is possible make the paper white portion conspicuous in the shadow area highly dispersive.

The dot arrangement according to the present embodiment described above is explained. Considering a case where the present embodiment is applied to an image in which all the pixels have the same pixel value, the dispersity of the dot arrangement of the large dot is the highest on a condition that the image plane is an image of the light tone. On the other hand, in a case where the image place is an image of the dark tone, the dispersity of the arrangement of the paper white portion (blank dot) is higher than that of the dot arrangement of the actual dots and the highest. Due to this, it is possible to suppress the granularity of the paper white portion from becoming conspicuous in the dark tone and the image quality from deteriorating.

Second Embodiment

In the first embodiment, the priority order at the time of the dot arrangement of the four kinds of dot (large, medium, and small dots plus zero dot) is determined for each pixel and for the pixel belonging to the dark tone, by giving priority to the arrangement of the blank dot, the paper white portion conspicuous in the shadow area is made highly dispersive. Next, an aspect is explained as a second embodiment in which the arrangement of the three kinds of dot, that is, the medium and small dots plus the zero dot, is made highly dispersive in total in the shadow area.

As described previously, in the shadow area, by making the arrangement of the blank dot visually conspicuous highly dispersive, a visually good image is obtained. However, in the shadow area, not only the blank dot corresponding to the paper white portion, but also the actual dot that is light compared to the image density (dot for which the ink ejection amount is relatively small) is likely to be conspicuous visually. Further, the dot for which the ink ejection amount is small has a small dot diameter on the paper surface and has a strong possibility of being exposed as the paper white portion due to the ink landing position shift. Consequently, a method is explained in which the arrangement of the medium and small dots plus the zero dot is determined in total so that not only the blank dot but also the actual dot whose dot diameter is comparatively small becomes highly dispersive. Explanation of the basic configuration and the separation processing unit of the image forming apparatus in common to those of the first embodiment is omitted and in the following, the contents of the quantization processing unit, which is the different point, are explained mainly.

The internal configuration of the quantization processing unit 115 of the present embodiment is basically the same as that of the first embodiment. That is, the quantization processing unit 115 includes the priority order determination unit 204, the dot arrangement determination unit 205, and the data output unit 206. However, the priority order determination unit 204 of the present embodiment differs from that of the first embodiment in determining the priority order for each image plane of CMYK in place of determining the priority order for each pixel of interest. Further, the dot arrangement determination unit 205 of the present embodiment differs from that of the first embodiment in comprising n error line buffers corresponding to each dot kind for which ink is ejected.

Figure 9:
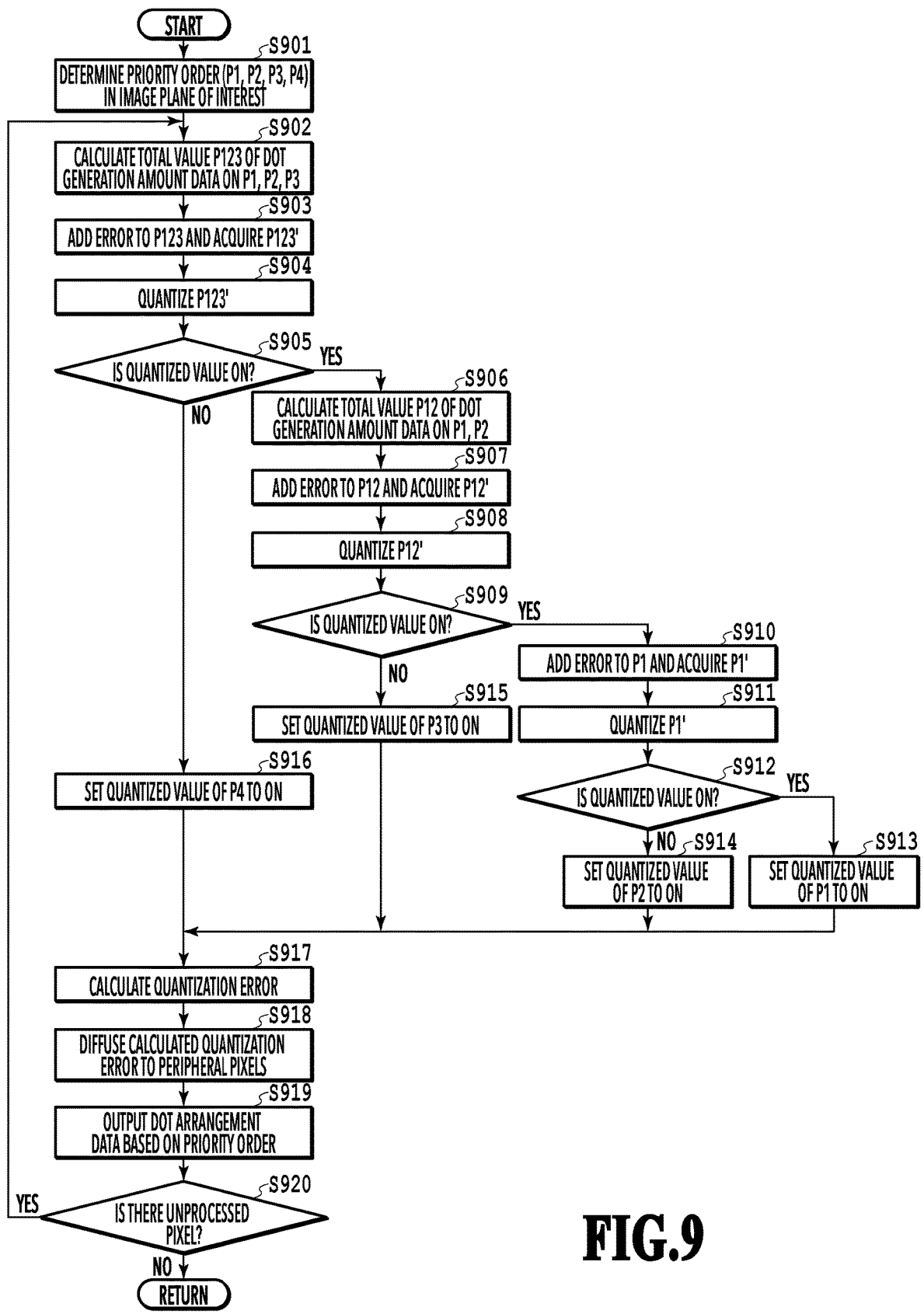
FIG. 9 is a flowchart showing details of quantization processing according to a second embodiment.

FIG. 9 is a flowchart showing the flow of the quantization processing according to the present embodiment. The quantization processing in the present embodiment is also the same for each color of CMYK, and therefore, in the following, explanation is given by taking black (K) as a representative example. In the following explanation, symbol "S" represents a step.

First, at S901, the priority order determination unit 204 determines the priority order (P1, P2, P3, P4) for the dot generation amount data on the blank dot and each of the large, medium, and small dots generated in the separation processing unit 114 for the entire K plane. In the present embodiment, it is assumed that importance is attached to the improvement of the granularity in the shadow area and the priority order is determined as P1=K_zero, P2=K_small, P3=K_medium, and P4=K_large.

Next, at S902 to 904, by using the total value of the dot generation amount data on the dots whose priority order is the top three, the quantization processing is performed for the pixel of interest and the dot arrangement of P1, P2, and P3 in total is determined.

At S902, a total value (hereinafter, described as "P123") of the dot generation amount data P1 (x, y), P2 (x, y), and P3 (x, y) corresponding to the pixel of interest position (x, y) is calculated. The total value P123 is expressed by formula (19) below.

$$P123 = P1(x,y) + P2(x,y) + P3(x,y) \quad \text{formula(19)}$$

At S903, for the total value P123 of the dot generation amount data corresponding to the pixel of interest position (x, y), its corresponding error E_P123 (x) is read from the error line buffer and added thereto. Total value data P123' after the error is added is expressed by formula (20) below.

$$P123'=P123+E\_P123(x) \quad \text{formula (20)}$$

At S904, quantization by a comparison between P123' and the threshold value Th is performed. In a case where P123' is greater than the threshold value Th, the quantization results are ON (=255) and in a case where P123' is less than or equal to the threshold value Th, the quantization results are OFF (=0). Here, it is assumed that the quantization results for P123' are represented as O_P123. In this manner, the dot arrangement that makes the three kinds of dot (here, each of zero, small, and medium dots) corresponding to P123 highly dispersive in total is determined. Then, for the rest of the highly dispersive arrangement of P1, P2, and P3, the dot arrangement of the dot (here, large dot) corresponding to P4 is determined.

Then at S905, whether the quantization results (O_P123) of P123' are ON or OFF is determined. In a case where O_P123 is ON (=255), the processing advances to S906. On the other hand, in a case where O_P123 is OFF (=0), the processing advances to S916.

Next, at S906 to S908, by using the total value of the dot generation amount data whose priority order is the top two, the quantization processing for the pixel of interest is performed and the dot arrangement of P1 and P2 in total is determined.

At S906, a total value (hereinafter, described as "P12") of the dot generation amount data P1 (x, y) and P2 (x, y) corresponding to the pixel of interest position (x, y) is calculated. The total value P12 is expressed by formula (21) below.

$$P12=P1(x,y)+P2(x,y) \quad \text{formula(21)}$$

At S907, for the total value P12 of the dot generation amount data corresponding to the pixel of interest position (x, y), its corresponding error E_P12 (x) is read from the error line buffer and added thereto. Total value data P12' after the error is added is expressed by formula (22) below.

$$P12'=P12+E\_P12(x) \quad \text{formula (22)}$$

At S908, quantization by a comparison between P12' and the threshold value Th is performed. In a case where P12' is greater than the threshold value Th, the quantization results are ON (=255) and in a case where P12' is less than or equal to the threshold value Th, the quantization results are OFF (=0). Here, it is assumed that the quantization results for P12' are represented as O_P12. In this manner, the dot arrangement that makes the two kinds of dot (here, zero dot and small dot) corresponding to P12 highly dispersive in total is determined. Then, for the rest of the highly dispersive arrangement of P1 and P2, the dot arrangement of the dot (here, medium dot) corresponding to P3 is determined.

Then, at S909, whether the quantization results (O_P12) of P12' are ON or OFF is determined. In a case where O_P12 is ON (=255), the processing advances to S910. On the other hand, in a case where O_P12 is OFF (=0), the processing advances to S915. Next, at S910 and S911, by using the dot generation amount data P1 whose priority order is the highest, the quantization processing for the pixel of interest is performed and the dot arrangement of P1 is determined.

At S910, for the dot generation amount data P1 (x, y) corresponding to the pixel of interest position (x, y), its corresponding error E_P1 (x) is read from the error line buffer and added thereto. The data P1' after the error is added is expressed by formula (23) below.

$$P1'=P1(x,y)+E\_P1(x) \quad \text{formula(23)}$$

At S911, quantization by a comparison between P1' and the threshold value Th is performed. In a case where P1' is greater than the threshold value Th, the quantization results are ON (=255) and in a case where P1' is less than or equal to the threshold value Th, the quantization results are OFF (=0). Here, it is assumed that the quantization results for P1' are represented as O_P1.

Then, at S912, whether the quantization results (O_P1) of P1' are ON or OFF is determined. In a case where O_P1 is ON (=255), the processing advances to S913. On the other hand, in a case where O_P1 is OFF (=0), the processing advances to S914.

At S913 to S916 that follow, processing to set the quantization results of P1, P2, P3, and P4 at the pixel of interest position (x, y) to ON (here, as the quantized value, 255 is set) is performed. That is, at S913, O_P1 (x, y) is set to ON, at S914, O_P2 (x, y) is set to ON, at S915, O_P3 (x, y) is set to ON, and at S916, O_P4 (x, y) is set to ON.

Next, at S917 and S918, quantization errors produced by the above-described quantization processing are diffused in accordance with predetermined error diffusion coefficients and stored in the error line buffer.

At S917, differences between the pixel values P123', P12', and P1' before the quantization processing is performed and each of the quantization results O_P123, O_P12, and O_P1 are calculated. Here, in a case where the differences to be calculated are taken to be ERR123, ERR12, and ERR1, they are expressed by formula (24) to formula (26) below, respectively.

$$ERR123=P123'-O\_P123(x,y) \quad \text{formula (24)}$$

$$ERR12=P12'-O\_P12(x,y) \quad \text{formula (25)}$$

$$ERR1=P1'-O\_P1(x,y) \quad \text{formula (26)}$$

At S918, the calculated errors are diffused to the pixels around the pixel of interest in accordance with the predetermined error diffusion coefficients (see FIG. 7 described previously). FIG. 10A to FIG. 10C each show an example of the error line buffer of the present embodiment. FIG. 10A is the error line buffer corresponding to the total value P123 of the dot generation amount data P1 (x, y), P2 (x, y), and P3 (x, y) corresponding to the pixel of interest position (x, y). Then, FIG. 10B is the error line buffer corresponding to the total value P12 of P1 (x, y) and P2 (x, y) and FIG. 10C is the error line buffer corresponding to P1 (x, y). Each error line buffer has (W (number of horizontal pixels in the input image)+1) storage areas (E_P123 (x), E_P12 (x), E_P1 (x), here, x=1 to (W+1)). Then, the quantization error is stored in each storage area. Specifically, the errors EEP123, ERR12, and ERR1 in P123, P12, and P1 are stored in each corresponding error line buffer as follows.

$$E\_P123(x+1)=E\_P123(x+1)+ERR123\times 7/16(x<W)$$

$$E\_P123(x-1)=E\_P123(x-1)+ERR123\times 3/16(x>1)$$

$$E\_P123(x)=E\_P123(W+1)+ERR123\times 5/16(1<x<W)$$

$$E\_P123(x)=E\_P123(W+1)+ERR123\times 8/16(x=1)$$

$$E\_P123(x)=E\_P123(W+1)+ERR123\times 13/16(x=W)$$

$$E\_P123(W+1)=ERR123\times 1/16(x<W)$$

$$E\_P123(W+1)=0(x=W)$$

$$E\_P12(x+1)=E\_P12(x+1)+ERR12\times 7/16(x<W)$$

$$E\_P12(x-1)=E\_P12(x-1)+ERR12\times3/16(x>1)$$

$$E\_P12(x)=E\_P12(W+1)+ERR12\times5/16(1<x<W)$$

$$E\_P12(x)=E\_P12(W+1)+ERR12\times8/16(x=1)$$

$$E\_P12(x)=E\_P12(W+1)+ERR12\times13/16(x=W)$$

$$E\_P12(W+1)=ERR12\times1/16(x<W)$$

$$E\_P12(W+1)=0(x=W)$$

$$E\_P1(x+1)=E\_P1(x+1)+ERR1\times7/16(x<W)$$

$$E\_P1(x-1)=E\_P1(x-1)+ERR1\times3/16(x>1)$$

$$E\_P1(x)=E\_P1(W+1)+ERR1\times5/16(1<x<W)$$

$$E\_P1(x)=E\_P1(W+1)+ERR1\times8/16(x=1)$$

$$E\_P1(x)=E\_P1(W+1)+ERR1\times13/16(x=W)$$

$$E\_P1(W+1)=ERR1\times1/16(x<W)$$

$$E\_P1(W+1)=0(x=W)$$

At S919 that follows, the data output unit 206 outputs the dot arrangement data corresponding to the actual large, medium, and small dots that the line head can form based on the priority order information received from the priority order determination unit 204. Here, according to the priority order information, the priority order is P1=K_zero, P2=K_small, P3=K_medium, and P4=K_large. In this case, as the ink ejection dot arrangement data on the pixel of interest position (x, y), the following three pieces of data are output to the image forming unit 120.

Large dot: O_P4 (x, y)
Medium dot: O_P3 (x, y)
Small dot: O_P2 (x, y)

Then, at S920, whether or not the processing for all the pixels of the K plane is completed is determined. In a case where there is an unprocessed pixel, the processing returns to S902, and the next pixel is taken as the pixel of interest and the processing is continued. On the other hand, in a case where the processing of all the pixels is completed, this processing is terminated.

The above is the contents of the quantization processing by the method of the present embodiment. FIG. 11A and FIG. 11B are diagrams explaining the effects of the quantization processing by the method of the present embodiment. FIG. 11A is an example in which the dot arrangement is determined so that the three kinds of dot, that is, the medium and small dots plus the zero dot, become highly dispersive in total in the dark tone and FIG. 11B is an example in which the dot arrangement is determined so that the three kinds of dot, that is, the large, medium, and small dots, become highly dispersive in total for comparison. From the comparison between both examples, it is known that the dot pattern in FIG. 11B is low in dispersity in the dot whose size is small (whose density level is low).

In a case where the dot separation table as shown in FIG. 4 described previously is used by attaching importance to improvement of granularity in the shadow area as in the present embodiment, the large dot is not used and ink dots are formed only by the medium dot and the small dot in each pixel in the highlight area. However, in a case where it is desired to attach importance to, for example, suppression of streaking (banding), a dot separation table that mixes also the large dot for the pixel in the highlight area is used sometimes. In this case, it is possible to obtain a good image by arranging the three kinds of actual dot, that is, the large, medium, and small dots, so that they are highly dispersive in total. Because of this, it is better to change the determination criterion of the priority order as appropriate in accordance with to which of improvement of granularity and suppression of streaking importance is attached by the image quality desired by a user. For example, in a case where it is desired to attach importance to suppression of streaking, it is sufficient to determine the priority order to be set for each processing-target image plane, for example, as P1=K_large, P2=K_medium, P3=K_small, and P4=K_zero.

According to the present embodiment, the arrangement of the pixel that is light and conspicuous in the dark tone becomes highly dispersive, and therefore, it is possible to obtain an image of good granularity.

Third Embodiment

In the first and second embodiments, the dot generation amount data on the blank dot corresponding to the paper white portion is generated based on the dot generation amount data on the n kinds of actual dot. Next, an aspect is explained as a third embodiment in which the dot generation amount data on the n kinds of actual dot and the dot generation amount data on the blank dot area generated at the same time by using a dot size separation table including information on the blank dot. Explanation of the contents in common to those of the first and second embodiments is omitted and in the following, different points are explained mainly.

Figure 12:
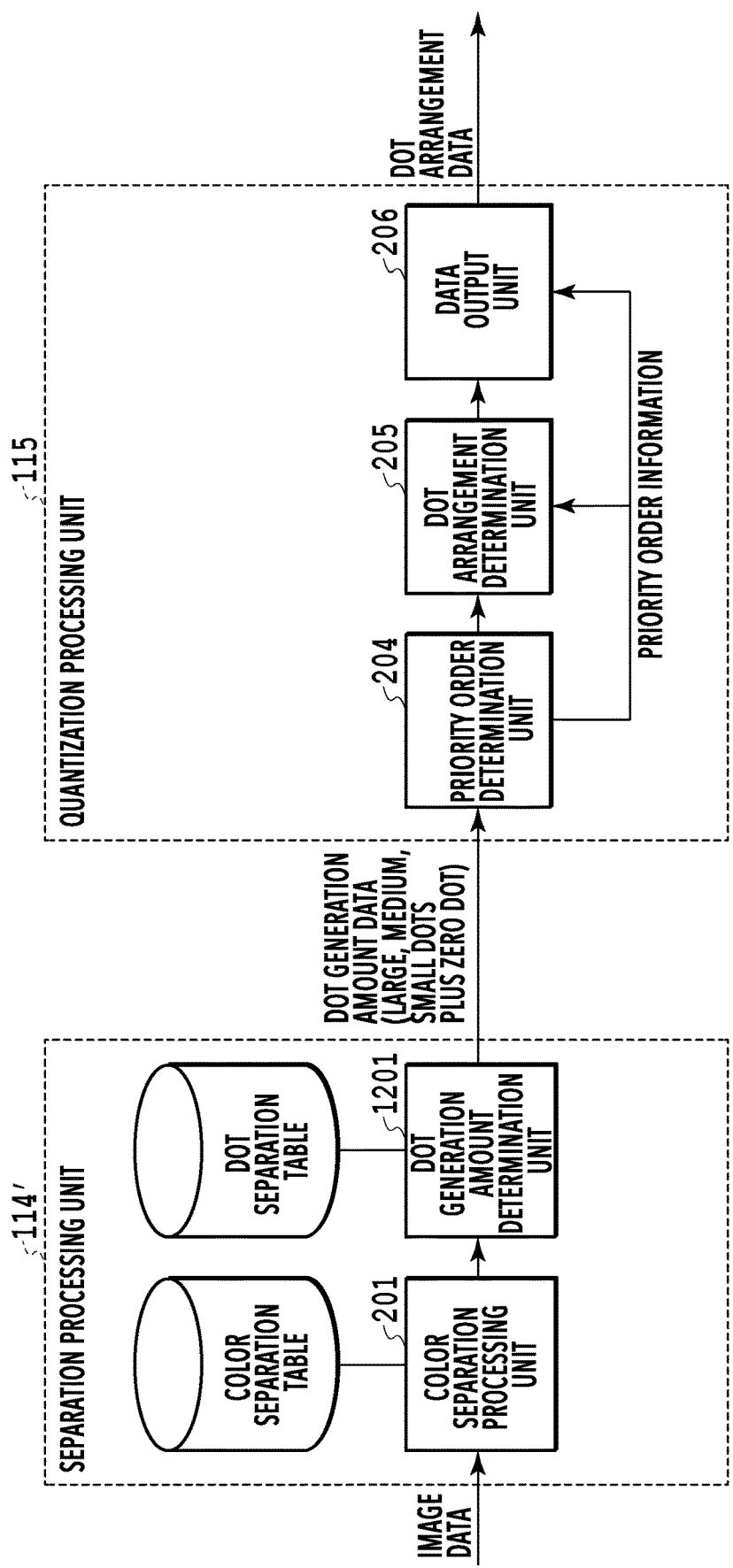
FIG. 12 is a functional block diagram showing an internal configuration of a separation processing unit and a quantization processing unit according to a third embodiment.
Figure 13:
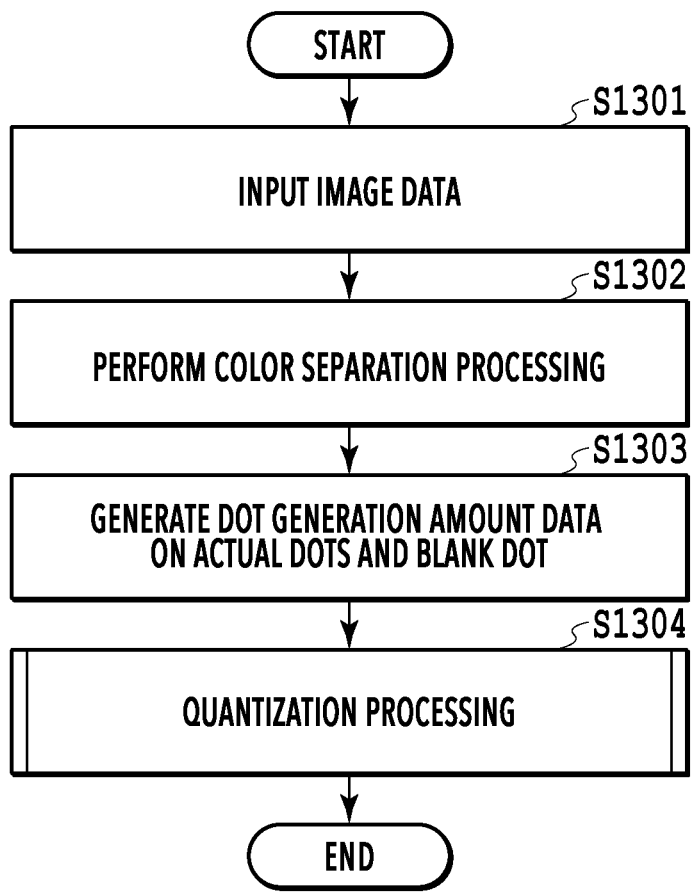
FIG. 13 is a flowchart showing a flow of processing within an image processing unit according to the third embodiment.

FIG. 12 is a functional block diagram showing the internal configuration of a separation processing unit 114' and the quantization processing unit 115. As shown in FIG. 12, the separation processing unit 114' includes the color separation processing unit 201 and a dot generation amount determination unit 1201. The quantization processing unit 115 includes the priority order determination unit 204, the dot arrangement determination unit 205, and the data output unit 206 as in the first embodiment. In the following, along the flowchart shown in FIG. 13, processing to generate the dot generation amount data on the actual dots and the dot generation amount data on the blank dot at the same time according to the present embodiment is explained. In the following explanation, symbol "S" represents a step.

At S1301, the multi-valued RGB image data that the image forming apparatus 100 has received from an external information processing apparatus (not shown schematically) is input to the color separation processing unit 201 of the separation processing unit 114'. At S1302 that follows, the color separation processing unit 201 performs color separation processing for the RGB image data and coverts it into CMYK image data by using a color separation table prepared in advance. The obtained CMYK image data is sent to the dot generation amount determination unit 1201.

Figure 14:
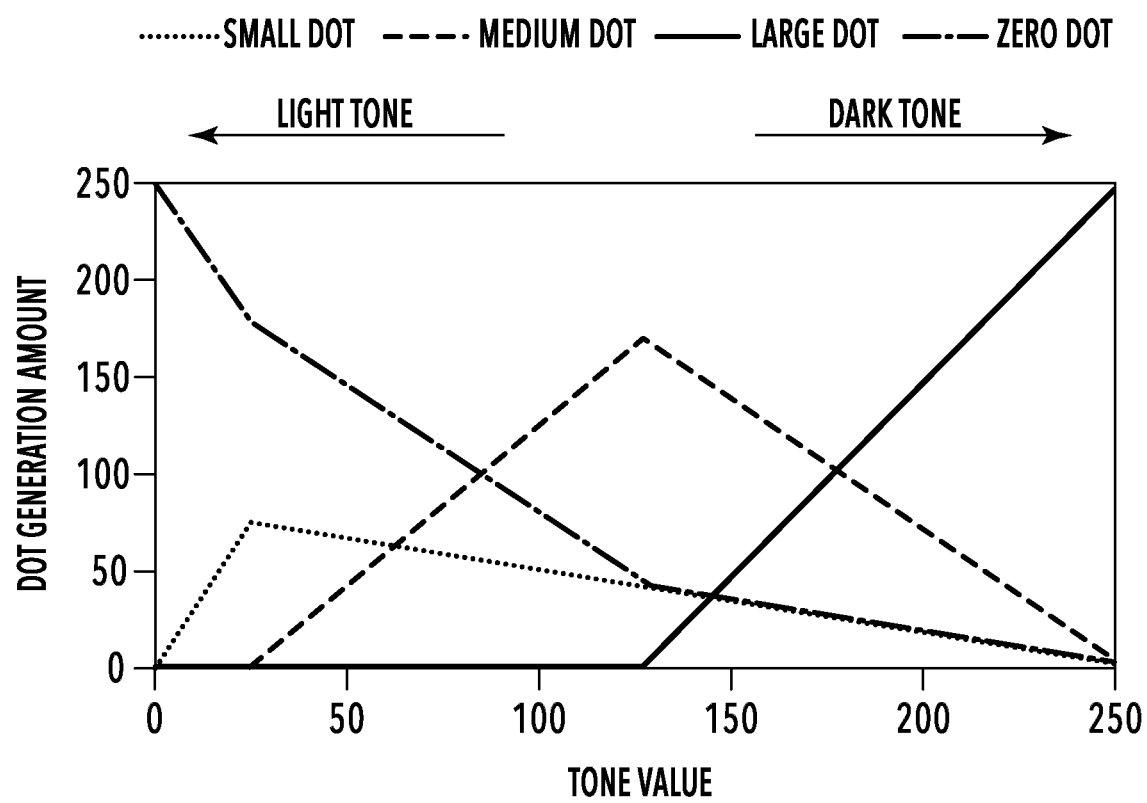
FIG. 14 is a diagram showing an example of a dot separation table according to the third embodiment.

At S1303, the dot generation amount determination unit 1201 performs dot size separation processing for the CMYK image data by using a dot separation table prepared in advance. In the present embodiment, each image plane of CMYK is separated into four kinds of dot (large, medium, and small dots plus zero dot) plane. FIG. 14 is a diagram showing an example of the dot separation table used in the present embodiment. Different from the dot separation table in FIG. 4 described previously, also for the blank dot, the dot generation amount for each tone is described. By using the dot separation table such as this, which also includes the information indicating the generation amount for each tone of the blank dot, each image plane of CMYK is separated into the four kinds of dot (large, medium, and small dots plus zero dot) plane at the same time. Then, by using the four kinds of dot generation amount data, the quantization processing explained in the first and second embodiments is performed at next S1304 and the dot arrangement in each image plane of CMYK is determined.

Modification Example

In the present embodiment, "color separation processing" and "dot generation amount data determination processing of actual dots plus blank dot" are performed separately, but it may also be possible to perform the processing at the same time. In a case where the processing is performed at the same time, for example, a separation table is stored in advance, in which values for each of (n+1) kinds of dot for each of CMYK corresponding to each RGB value are stored. Then, by referring to the separation table, the input RGB image data is separated into four kinds of dot plane for each of CMYK as shown below.

C_large, C_medium, C_small, C_zero
M_large, M_medium, M_small, M_zero
Y_large, Y_medium, Y_small, Y_zero
K_large, K_medium, K_small, K_zero Further, it may also be possible to design the configuration so that the dot generation amount data for each dot size to which the priority order is attached is generated directly from the CMYK image data after color separation by providing a processing unit that integrates the dot generation amount determination unit 1201 and the priority order determination unit 204. A case where this way of thinking is applied to the second embodiment will be, for example, as follows. First, a dot separation table in accordance with the image quality desired by a user (importance is attached to granularity or to suppression of streaking) is prepared. Further, criterion information on the priority order is prepared separately, which gives the highest priority to the blank dot in a case where importance is attached to granularity or to the large dot in a case where importance is attached to suppression of streaking. Then, in accordance with which a user attaches importance to, the dot separation table and the priority order criterion information to be used are switched and four pieces (P1 to P4) of dot generation amount data are output. For example, in a case where importance is attached to granularity, in accordance with the dot separation table describing the dot generation amount of each dot and the priority order criterion information that gives the highest priority to the blank dot, each piece of dot generation amount data is output, that is, P1 for the zero dot, P2 for the small dot, P3 for the medium dot, and P4 for the large dot. In a case where importance is attached to suppression of streaking, determination of the dot generation amounts of the actual large, medium, and small dots naturally determines the dot generation amount of the remaining blank dot, and therefore, in this case, output may be terminated after the three pieces of dot generation amount data on P1 to P3 are output.

As described above, in the present embodiment, by using the separation table for each dot size, which also includes information on the blank dot, as shown in FIG. 14, the dot generation amount data on each of (n+1) kinds of dot is generated at the same time. In a case of the present embodiment, the blank dot generation amount determination unit is no longer necessary, and therefore, it is possible to further simplify the configuration of the separation processing unit. Further, it is possible to specify the generation amount of the blank dot in detail for each tone, and therefore, it is made possible to control the pixel of the paper white portion more directly.

Fourth Embodiment

In the first to third embodiments, by using the dot generation amount data corresponding to each of the large, medium, and small dots plus the zero dot, the dot arrangement is determined in order from the dot whose priority order is the highest. That is, the dot arrangement is determined on the premise that each of the (n+1) kinds of dot is completely exclusive of one another. Next, an aspect is explained as a fourth embodiment in which the complete exclusion is not premised at the time of determining the arrangement of each of the (n+1) kinds of dot and the overlap between dots of different kinds is permitted. In the following, explanation is given based on the first embodiment and different points are explained mainly.

Figure 15:
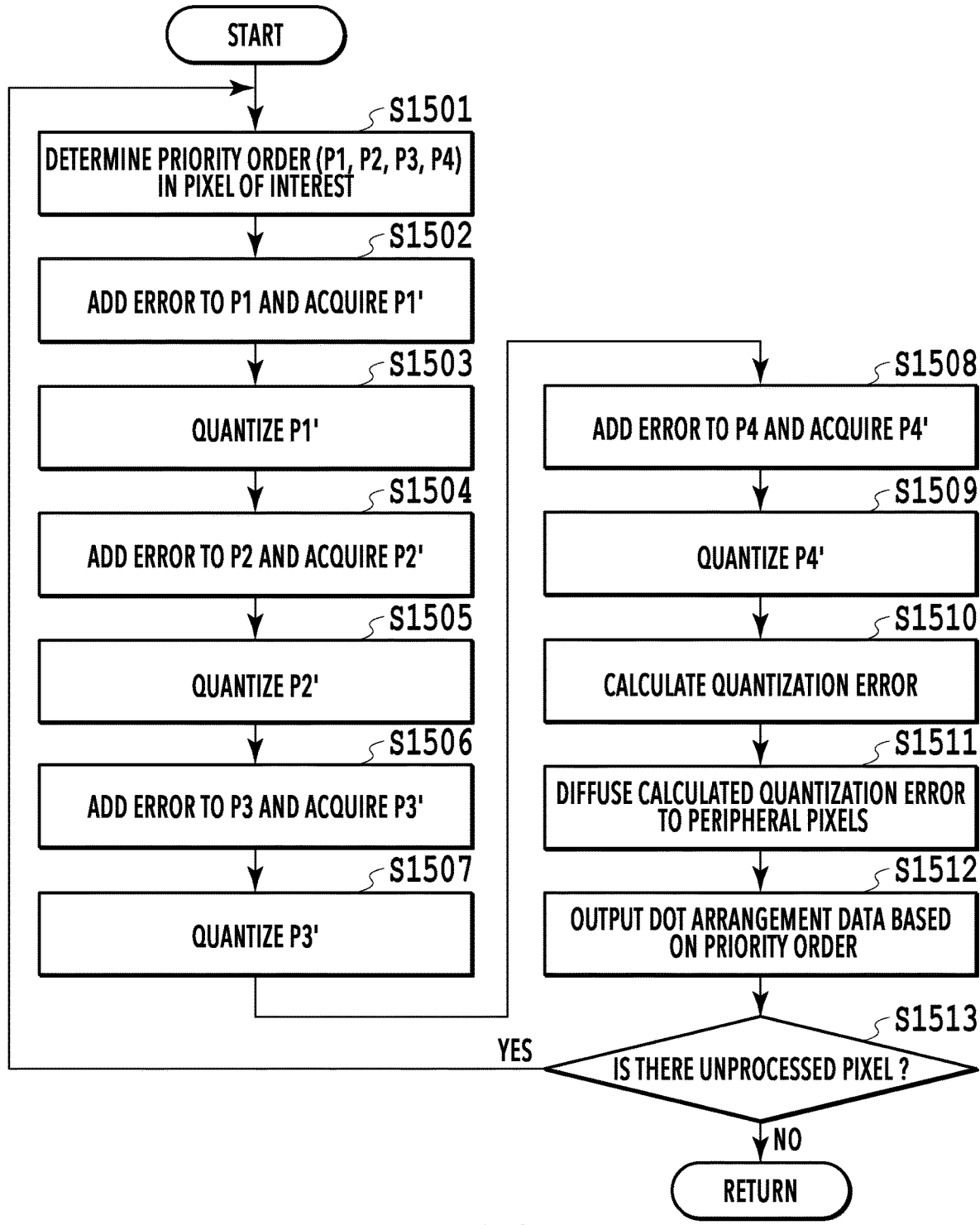
FIG. 15 is a flowchart showing details of quantization processing according to a fourth embodiment.

FIG. 15 is a flowchart showing the flow of quantization processing that permits the overlap between dots of different kinds in the dot arrangement determination unit 205 according to the present embodiment. This flowchart is different from the flowchart in FIG. 6 of the first embodiment in that the steps corresponding to S604, S607, and 610 do not exist. In the following, explanation is given along the flow in FIG. 15. In the following explanation, symbol "S" represents a step.

First, as at S601, for the pixel of interest of the processing-target image plane, the priority order (P1, P2, P3, P4) of the four kinds (large, medium, and small dots plus zero dot) of dot generation amount data generated in the separation processing unit 114 is determined (S1501). Next, to the dot generation amount data P1 (x, y) corresponding to the pixel of interest position (x, y), its corresponding error E_P1 (x) is added and the dot generation amount data P1' after the error is added is acquired (S1502). Then, quantization by a comparison between P1' and the threshold value Th is performed (S1503). After this, similarly, the processing is performed for P2 (x, y), P3 (x, y), and P4 (x, y). That is, to the dot generation amount data P2 (x, y) corresponding to the pixel of interest position (x, y), its corresponding error E_P2 (x) is added and the dot generation amount data P2' after the error is added is acquired (S1504). Then, quantization by a comparison between P2' and the threshold value Th is performed (S1505). Next, to the dot generation amount data P3 (x, y) corresponding to the pixel of interest position (x, y), its corresponding error E_P3 (x) is added and the dot generation amount data P3' after the error is added is acquired (S1506). Then, quantization by a comparison between P3' and the threshold value Th is performed (S1507). Further, to the dot generation amount data P4 (x, y) corresponding to the pixel of interest position (x, y), its corresponding error E_P4 (x) is added and the dot generation amount data P4' after the error is added is acquired (S1508). Then, quantization by a comparison between P4' and the threshold value Th is performed (S1509).

Following the above, errors that are differences between the values P1', P2', P3', and P4' before the quantization processing is performed and each of the quantization results are calculated (S1510) and the calculated errors are diffused to the pixels around the pixel of interest in accordance with predetermined error diffusion coefficients (S1511).

Then, based on the priority order, the dot arrangement data corresponding to each of the large, medium, and small dots is output (S1512). As described previously, in a case of the line head, it is only possible to eject an amount of ink corresponding to one kind of dot for the same position from one nozzle. Because of this, the data output unit 206 determines one target dot based on the priority order information among each of the large, medium, and small dots plus the zero dot and outputs the arrangement data on the dot. That is, the data output unit 206 determines one kind of dot in accordance with the priority order information and outputs the arrangement data on the dot. For example, for the pixel belonging to the dark tone, P1 is for the zero dot, and therefore, except for this, the dot arrangement data on the actual dots is output in the priority order of P2 for the small dot, P3 for the medium dot, and P4 for the large dot. For example, in a case where the dot arrangement data corresponding to P2 is output, the dot arrangement of P2 is output from the position that is the rest of the dot arrangement of P1 (among the dots of P2, only the dots at the position that does not overlap the dots of P1 are output). Further, similarly, in a case where the dot arrangement data corresponding to P3 is output, the dot arrangement of P3 is output from the position that is the rest of the dot arrangement of P1 and P2 (among the dots of P3, only the dots at the position that does not overlap the dots of P1 and P2 are output). Furthermore, in a case where the dot arrangement data corresponding to P4 is output, the dot arrangement of P4 is output from the position that is the rest of the dot arrangement of P1 to P3 (among the dots of P4, only the dots at the position that does not overlap the dots of P1 to P3 are output). At this time, in the portion in which the overlap occurs with another dot arrangement, all the intended dots are not formed, and therefore, the target density is not achieved in the final output results. Consequently, in a case of the present embodiment, it is desirable to design the dot separation table by taking into consideration the possibility such as this and determine the dot generation amount of each dot.

The above-described processing is repeated for all the pixels (S1513). The above is the contents of the quantization processing by the method of the present embodiment.

According to the present embodiment, also in a case where the dot arrangement is determined without premising that the dots of different kinds are completely exclusive of one another, it is possible to obtain the effects in the embodiments described previously.

Fifth Embodiment

In the first to fourth embodiments, the aspect is explained in which the arrangement of the blank dot corresponding to the paper white portion is determined with priority at the time of determining the arrangement of the plurality of different kinds of dot whose ink ejection amount (=dot size) is different. Next, an aspect is explained as a fifth embodiment in which the arrangement of the blank dot corresponding to the paper white portion is determined with priority over the actual dots in each color of CMYK.

In the following, explanation is given by taking a case as an example where the method of the first embodiment is applied to the determination of the dot arrangement for each color, but the configuration may be one in which the dot arrangement for each color is determined by applying the method of another embodiment.

In a case where the first embodiment is applied to the arrangement determination of the actual dots in each color of CMYK, the configuration of the separation processing unit 114 and the quantization processing unit 115 may be the configuration shown in FIG. 2 described previously. That is, the separation processing unit 114 includes the color separation processing unit 201, the actual dot generation amount determination unit 202, and the blank dot generation amount determination unit 203. Further, the quantization processing unit 115 includes the priority order determination unit 204, the dot arrangement determination unit 205, and the data output unit 206. In the following, explanation is given along the flow in FIG. 3 explained in the first embodiment.

In a case where printing-target color (RGB) image data is input (S301), the color separation processing unit 201 performs color separation processing for the RGB image data and converts it into CMYK image planes corresponding to each ink color (S302). Then, the actual dot generation amount determination unit 202 performs dot size separation processing for the CMYK image data and generates dot generation amount data for each size of the large, medium, and small dots (S303). Due to this, the following twelve dot planes are obtained.

C plane→C_large, C_medium, C_small
M plane→M_large, M_medium, M_small
Y plane→Y_large, Y_medium, Y_small
K plane→K_large, K_medium, K_small By using the total of twelve dot planes thus generated, the blank dot generation amount determination unit 203 generates dot generation amount data D_zero corresponding to the blank dot corresponding to the paper white portion in which no actual dot in any color is formed (S304). That is, in the preceding embodiments, the zero dot generation amount data (C_zero, M_zero, Y_zero, K_zero) is generated for each color of CMYK, but in the present embodiment, the zero dot generation amount data D_zero common to the colors is generated. In this case, accumulated dot generation amount data C_all, M_all, Y_all, and K_all on the large, medium, and small dots in each color of CMYK is expressed by formula (27) to formula (30) below, respectively.

$$C\_all = C\_large + C\_medium + C\_small \qquad \text{formula (27)}$$

$$M\_all = M\_large + M\_medium + M\_small \qquad \text{formula (28)}$$

$$Y\_all = Y\_large + Y\_medium + Y\_small \qquad \text{formula (29)}$$

$$K\_all = K\_large + K\_medium + K\_small \qquad \text{formula (30)}$$

Then, the zero dot generation amount data D_zero common to the colors is expressed by formula (31) below.

$$D\_zero = 255 - K\_all - C\_all - M\_all - Y\_all \qquad \text{formula (31)}$$

In a case where D_zero is smaller than 0, D_zero is clipped to 0. In this manner, to the quantization processing unit 115, the accumulated dot generation amount data on the large, medium, and small dots in each color of CMYK and the dot generation amount data on the blank dot common to the colors are input.

Figure 16:
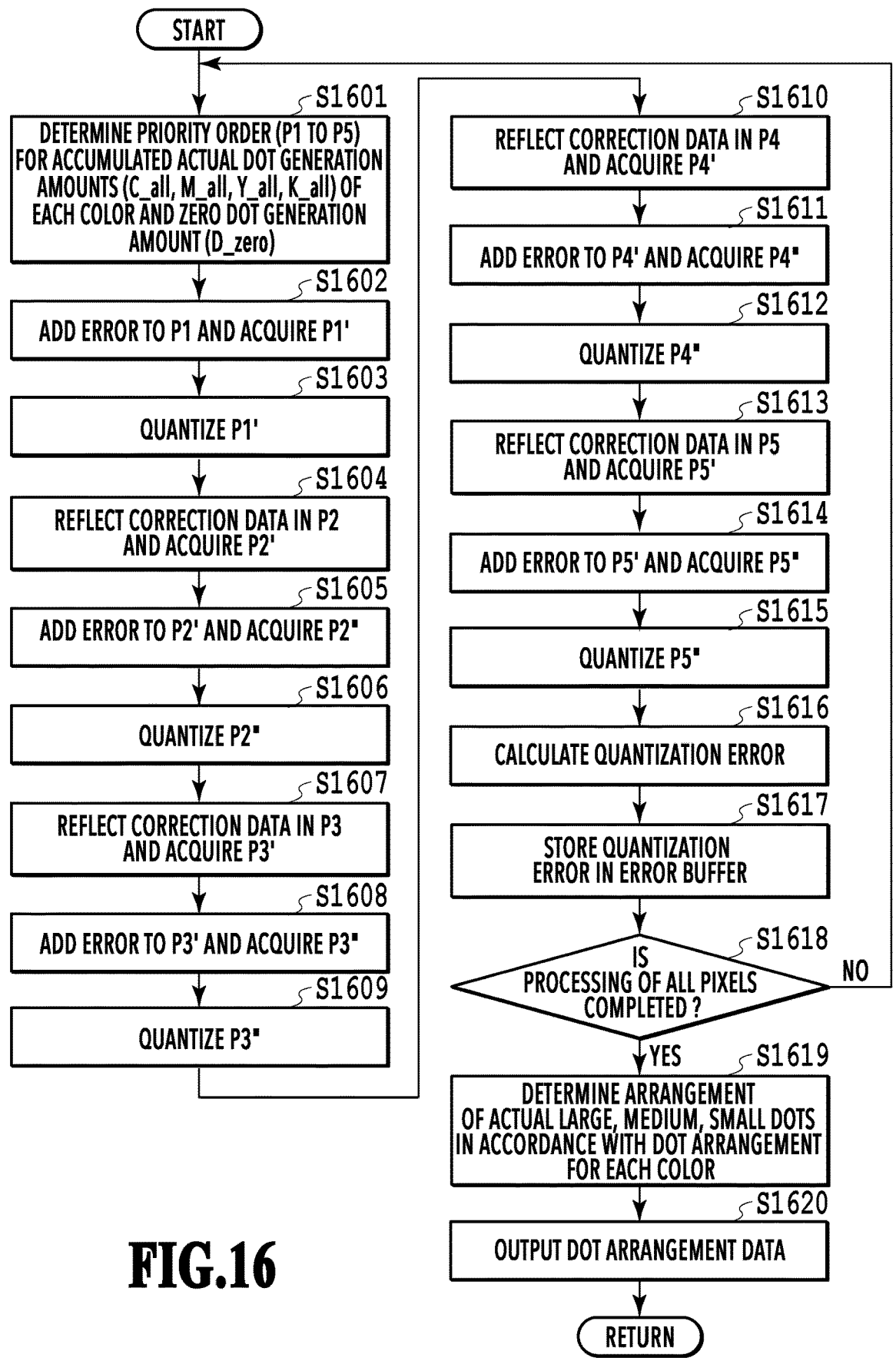
FIG. 16 is a flowchart showing details of quantization processing according to a fifth embodiment.

Then, the quantization processing unit 115 performs the quantization processing (S305) to give priority to the arrangement of the blank dot corresponding to the paper white portion in the final output results obtained by superimposing each plane of CMYK after all the actual dots are formed. FIG. 16 is a flowchart showing the flow of quantization processing to determine the arrangement of each dot in each color by taking the accumulated dot arrangement for each color as a restriction in the dot arrangement determination unit 205 of the present embodiment. In the following, explanation is given along the flow in FIG. 16. In the following explanation, symbol "S" represents a step.

First, at S1601, the priority order determination unit 204 determines the priority order for the accumulated dot generation amount data on each color of CMYK and the zero dot generation amount data common to the colors in the pixel of interest. Here, it is assumed that the priority order is represented as Px (x=1 to 5) in order from the highest priority. Further, it is assumed that the dot generation amount data on the large dot belonging to Px is represented as Px_large, the dot generation amount data on the medium dot as Px_medium, and the dot generation amount data on the small dot as Px_small. For example, in a case of the pixel of interest belong to the dark tone, Px is determined as P1=D_zero, P2=K_all, P3=M_all, P4=C_all, and P5=Y_all. Due to this, it is possible to make the dot arrangement of the dot conspicuous in the shadow area highly dispersive with priority.

Then, at S1602 to S1618, the dot arrangement determination unit 205 converts the accumulated dot generation amount data (Px) into binary dot arrangement data (O_Px) in accordance with the determined priority order. Specifically, as follows.

First, for the dot generation amount data P1 (x, y) corresponding to the pixel of interest position (x, y), its corresponding error E_P1 (x) is read from the error line buffer and added thereto (S1601). Then, quantization by a comparison between P1' and the threshold value Th is performed (S1603). In this manner, in the dark tone, the arrangement of the blank dot corresponding to P1 is determined with priority over the actual dots in each color.

Next, for the dot generation amount data (here, K_all) on P2 whose priority order is the second highest, the quantization processing is performed and the dot arrangement is determined. First, the correction amount H based on the arrangement determination results of the dot (here, zero dot) whose priority order is higher is calculated and the obtained correction amount H is reflected in the dot generation amount data P2 (x, y) corresponding to the pixel of interest position (x, y) (S1604). Then, for the dot generation amount data P2 (x, y) corresponding to the pixel of interest position (x, y), its corresponding error E_P2 (x) is read from the error line buffer and added thereto (S1605). Then, quantization by a comparison between P2" and the threshold value Th is performed (S1606).

Next, for the dot generation amount data (here, M_all) on P3 whose priority order is the third highest, the quantization processing is performed and the dot arrangement is determined. First, the correction amount H based on the arrangement determination results of the dots (here, zero and K dots) whose priority order is higher is calculated and the obtained correction amount H is reflected in the dot generation amount data P2 (x, y) corresponding to the pixel of interest position (x, y) (S1607). Then, for the dot generation amount data P3 (x, y) corresponding to the pixel of interest position (x, y), its corresponding error E_P3 (x) is read from the error line buffer and added thereto (S1608). Then, quantization by a comparison between P3" and the threshold value Th is performed (S1609).

Next, for the dot generation amount data (here, C_all) on P4 whose priority order is the fourth highest, the quantization processing is performed and the dot arrangement is determined. First, the correction amount H based on the arrangement determination results of the dots (here, zero, K, and M dots) whose priority order is higher is calculated and the obtained correction amount H is reflected in the dot generation amount data P3 (x, y) corresponding to the pixel of interest position (x, y) (S1610). Then, for the dot generation amount data P4 (x, y) corresponding to the pixel of interest position (x, y), its corresponding error E_P4 (x) is read from the error line buffer and added thereto (S1611). Then, quantization by a comparison between P4" and the threshold value Th is performed (S1612).

Next, for the dot generation amount data (here, Y_all) on P5 whose priority order is the fifth highest, the quantization processing is performed and the dot arrangement is determined. First, the correction amount H based on the arrangement determination results of the dots (here, zero, K, M, and C dots) whose priority order is higher is calculated and the obtained correction amount H is reflected in the dot generation amount data P4 (x, y) corresponding to the pixel of interest position (x, y) (S1613). Then, for the dot generation amount data P5 (x, y) corresponding to the pixel of interest position (x, y), its corresponding error E_P5 (x) is read from the error line buffer and added thereto (S1614). Then, quantization by a comparison between P5" and the threshold value Th is performed (S1615).

Following the above, differences between the values P1", P2", P3", P4", and P5" before the quantization processing is performed and each of the quantization results O_P1, O_P2, OP3, OP4, and O_P5 are calculated (S1616). Then, the calculated errors are diffused to the pixels around the pixel of interest in accordance with the error diffusion coefficients described previously (S1617). Specifically, the errors ERR_P1, ERR_P2, ERR_P3, ERR_P4, and ERR_P5 in P1 to P5 are stored respectively in the corresponding error buffers.

Then, whether or not the processing for all the pixels of the input image is completed is determined (S1618). In a case where there is an unprocessed pixel, the next pixel is taken as the pixel of interest and the processing is continued. On the other hand, in a case where the processing of all the pixels is completed, the processing advances to S1619.

Next, based on the dot arrangement data (O_Px (x=1 to 5)) and the dot generation amount data on each of the large, medium, and small dots (Px_large, Px_medium, Px_small (x=1 to 5)), the dot arrangement data on the large, medium, and small dots for each of CMYK is generated (S1619). For the determination of the arrangement of the large, medium, and small dots for each color by taking the already-determined dot arrangement data (O_Px (x=1 to 5)) as a restriction, it may be possible to appropriately use the conventional technique disclosed in, for example, Patent Literature 2. In a case where the target dot arrangement data O_Px is the dot arrangement data on the blank dot, which does not have the dot generation amount data on the large, medium, and small dots, this is regarded as a case to which this processing is not applied, and therefore, this processing is skipped.

Then, based on the priority order information, the dot arrangement data corresponding to each of the large, medium, and small dots that the line head can form is output (S1620). In a case where the priority order information is P1=D_zero, P2=K_all, P3=M_all, P4=C_all, and P5=Y_all, the dot arrangement data on the large, medium, and small dots is output in order from black.

The above is the contents of the quantization processing according to the method of the present embodiment. According to the present embodiment, it is possible to obtain an image whose dispersity of the dot arrangement between colors is high and whose granularity is good.

Modification Example

In the first to fifth embodiments, the quantization processing is performed based on the priority order information indicating the priority order. However, it is not necessarily required to generate the priority order information based on the dot generation amount data in order to implement the same processing. For example, for the image plane corresponding to each color of CMYK, the tone value of each pixel is compared with a predetermined threshold value. In a case where the tone value is less than the predetermined threshold value, the quantization processing unit that quantizes the dots in order of the large dot, the medium dot, the small dot, and the blank dot quantizes the generation amount of each dot in the pixel of interest. In a case where the tone value is greater than or equal to the predetermined threshold value, the quantization processing unit that quantizes the dots in order of the blank dot, the small dot, the medium dot, and the large dot quantizes the generation amount of each dot in the pixel of interest. By changing the processing into the branched processing such as this, it is possible to implement the same processing by a configuration that does not require the processing of the priority order information.

Further, in the first to fifth embodiment, for all the pixels, the processing to calculate the dot generation amount data on the blank dot corresponding to the paper white portion is performed. However, in a case of the dark tone, it is desirable to arrange the black dot with priority so that the dispersity becomes high. Consequently, it may also be possible to determine the arrangement of each dot by using only the dot generation amount data corresponding to the conventional actual dots in a case where the tone is in the light portion, and apply the above-described embodiments in a case where the tone is in the dark portion. Alternatively, for the pixel whose tone is in the light portion, also by setting the data indicating the generation amount of the blank dot to "0", it is possible to simplify the processing in the light portion.

Further, in the first to fifth embodiments, in a case of the dark tone, the blank dot corresponding to the paper white portion is arranged with priority over the other actual dots. However, for example, in a case where the printing medium is not white and the printing medium is in a color such as gray, the dot that is likely to be conspicuous in the dark tone may be in order of the small dot, the blank dot, the medium dot, and the large dot. In such a case, it is sufficient to determine the priority order in the dark tone in order of the small dot, the blank dot, the medium dot, and the large dot.

Sixth Embodiment

Figure 17:
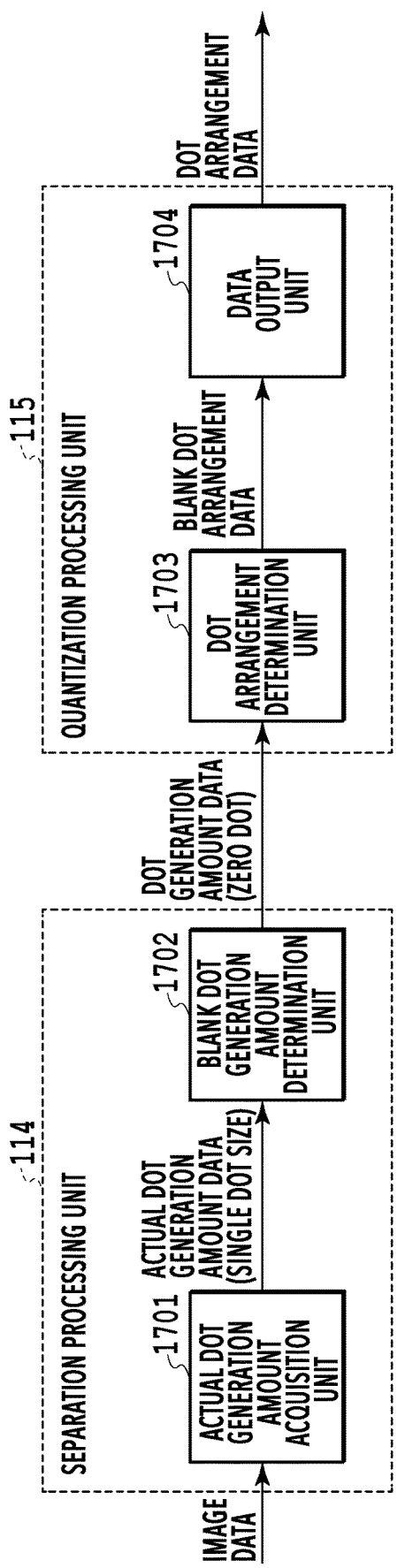
FIG. 17 is a functional block diagram showing an internal configuration of a separation processing unit and a quantization processing unit according to a sixth embodiment.
Figure 18:
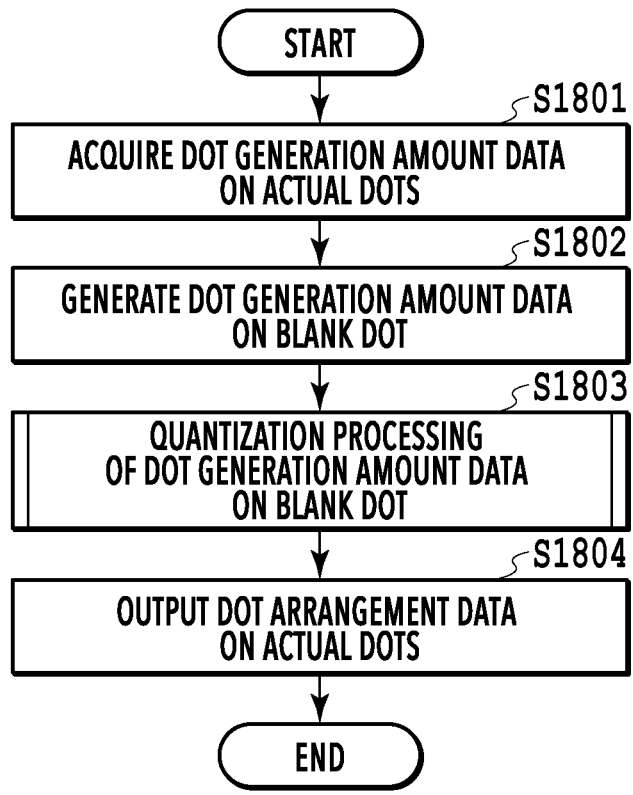
FIG. 18 is a flowchart showing a flow of processing within an image processing unit according to the sixth embodiment.

Next, an aspect is explained as a sixth embodiment in which the arrangement of the blank dot is determined with priority by the quantization processing and the actual dots for which ink is ejected actually are arranged at the position that is the rest of the arrangement position of the blank dot. In the present embodiment, explanation is given by taking a case as an example where image formation is performed with a single dot size in the image plane in each ink color. FIG. 17 is a functional block diagram showing the internal configuration of the separation processing unit 114 and the quantization processing unit 115 according to the present embodiment. As shown in FIG. 17, the separation processing unit 114 comprises an actual dot generation amount acquisition unit 1701 and a blank dot generation amount determination unit 1702. The actual dot generation amount acquisition unit 1701 acquires a tone image having the same kinds of color, the same number of colors, and the same resolution as those of the ink colors ejected in the image forming unit 120. The blank dot generation amount determination unit 1702 determines the generation amount of the blank dot corresponding to the paper white portion in which no actual dot is formed. The quantization processing unit 115 comprises a dot arrangement determination unit 1703 and a data output unit 1704. The dot arrangement determination unit 1703 performs the quantization processing by the error diffusion method for the blank dot generation amount data and determines the arrangement of the blank dot. The data output unit 1704 outputs the dot arrangement data on the actual dots that the line head can form based on the blank dot arrangement data received from the dot arrangement determination unit 1703. In the following, the processing of each unit shown in FIG. 17 is explained in detail along the flowchart shown in FIG. 18. In the following explanation, symbol "S" represents a step.

At S1801, the actual dot generation amount acquisition unit 1701 acquires the dot generation amount data on the actual dots from a preprocessing unit, not shown schematically. That is, it is assumed that in the previous stage of the actual dot generation amount acquisition unit 1701, by the preprocessing unit, not shown schematically, the necessary preprocessing, such as color conversion and resolution conversion, is performed and image data after the preprocessing is acquired. In this case, the dot generation amount data on the actual dots is the image data having the same kinds of color, the same number of colors, and the same resolution as those of the ink colors used in the image forming unit 120. For example, in a case of the ink jet method that implements an output resolution of 1,200 dpi by using four color inks of cyan (C), magenta (M), yellow (Y), and black (K), multi-valued image data having eight bits (256 tones) for each color of CMYK is acquired as the dot generation amount data on the actual dots. The subsequent processing is the same for each color of CMYK, and therefore, in the following, explanation is given by taking black (K) as a representative example.

At S1802, the blank dot generation amount determination unit 1702 determines the generation amount of the blank dot corresponding to the paper white portion in which no actual dot is formed based on the dot generation amount data on the actual dots acquired at S1801. Specifically, the dot generation amount data on the blank dot is obtained by calculating "255−actual dot generation amount" for each pixel based on the acquired dot generation amount data on the actual dots. The dot generation amount data on the blank dot thus obtained is sent to the quantization processing unit 115.

At S1803, the dot arrangement determination unit 1703 performs the quantization processing by the error diffusion method for the dot generation amount data on the blank dot and determines the dot arrangement of the blank dot. Due to this, the dot arrangement data on the blank dot in which ON or OFF of the dot is indicated for each pixel is obtained. Details of the quantization processing here will be described later. The dot arrangement data on the blank dot obtained by the quantization processing is sent to the data output unit 1704.

At S1804, the data output unit 1704 outputs the dot arrangement data on the actual dots that can be formed by the line head based on the dot arrangement data on the blank dot received from the dot arrangement determination unit 1703. Specifically, the dot arrangement data on the actual dots is obtained by reversing (changing ON to OFF, OFF to ON) the dot arrangement data on the blank dot for each pixel.

The above is the outline of the processing in the separation processing unit 114 and the quantization processing unit 115 according to the present embodiment.

(Details of Quantization Processing)

Figure 19:
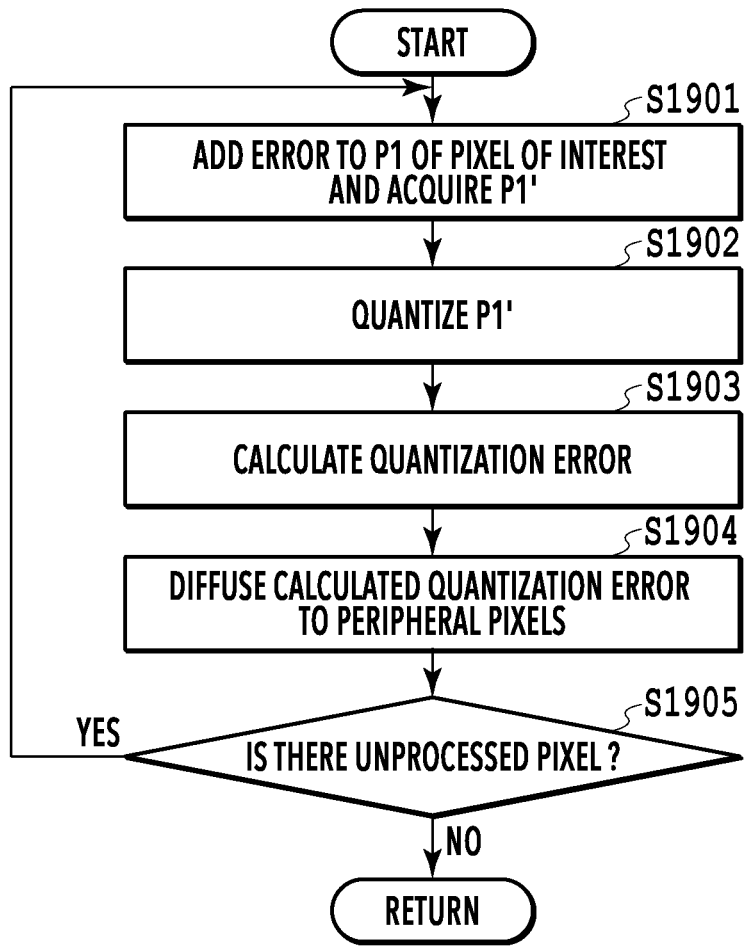
FIG. 19 is a flowchart showing details of quantization processing according to the sixth embodiment.

Following the above, details of the quantization processing at S1803 are explained along the flowchart in FIG. 19. Here, explanation is given by taking a case as an example where the quantization processing for the dot generation amount data on the blank dot is performed by the error diffusion method. In this case, in order to diffuse and accumulate errors, the error line buffers corresponding to the blank dot are prepared. All the error line buffers are initialized by an initial value (=0) or a random value before the start of the processing.

At S1901, for the dot generation amount data P1 (x, y) corresponding to the pixel of interest position (x, y), its corresponding error E_P1 (x) is read from the error line buffer and added thereto. The dot generation amount data P1' after the error is added is expressed by formula (32) below.

$$P1'=P1(x,y)+E\_P1(x) \quad \text{formula(32)}$$

Then, at S1902, quantization by a comparison between P1' and the threshold value Th is performed. In a case where P1' is greater than the threshold value Th, the quantization results are ON and in a case where P1' is less than or equal to the threshold value Th, the quantization results are OFF. Here, it is assumed that the quantization results for P1' are represented as O_P1. In this manner, the arrangement of the blank dot corresponding to P1 is determined with priority over the actual dots.

Next at S1903, a difference between the value P1' before the quantization processing is performed and the quantization results O_P1 is calculated as a quantization error. At S1904 that follows, the calculated quantization error (P1'−O_P1) is diffused (stored in the error line buffer) to the pixels around the pixel of interest in accordance with the error diffusion coefficients.

Then, at S1905, whether or not the processing for all the pixels of the K plane is completed is determined. In a case where there is an unprocessed pixel, the processing returns to S1901, and the next pixel is taken as the pixel of interest and the processing is continued. On the other hand, in a case where the processing of all the pixels is completed, this processing is terminated.

The above is the contents of the quantization processing by the method of the present embodiment.

Modification Example

In the present embodiment, explanation is given by taking the case of the quantization processing using the error diffusion method as an example, but the quantization processing using the dither method may be accepted. In a case by the dither method, a dither matrix obtained by arranging different threshold values within a matrix of a predetermined size is prepared in advance, and this dither matrix is sequentially loaded in tiles on the input image data and the tone value of the input image data and the corresponding threshold value are compared in magnitude. Then, in a case where the tone value is greater than the threshold value, the dot is turned ON and in a case where the tone value is less than threshold value, the dot is turned OFF. Compared to the error diffusion method, the dither method has an advantage in that the processing speed is high and it is possible to design the configuration by a simple circuit because the feedback of the quantization error is not necessary.

The quantization processing in a case by the dither method is explained with reference to FIG. 20A to FIG. 20C. In this case, it is assumed that the dot generation amount data on the blank dot shown in FIG. 20A is represented as P1 and the tone value at the pixel position (x, y) in P1 is represented as P1 (x, y).

Figures 20A, 20B, 20C:
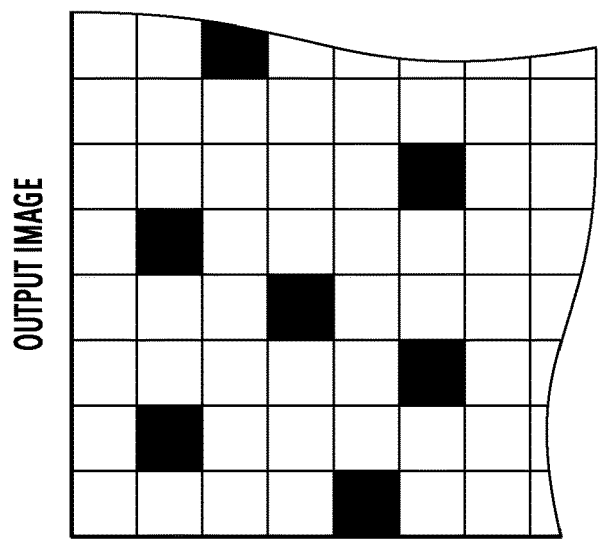
FIG. 20A to FIG. 20C are explanatory diagrams of quantization processing by a dither method.

For the pixel of interest position (x, y) in the dot generation amount data P1 in FIG. 20A, the tone value P1 (x, y) of the dot generation amount data on the blank dot and the corresponding threshold value in a dither matrix M (x, y) shown in FIG. 20B are compared in magnitude. Then, in a case where the tone value is greater than the threshold value, a value (ON) indicating that the blank dot is arranged is determined as the output value and in other cases, a value (OFF) indicating that the bland dot is not arranged is determined as the output value. Here, in the dot generation amount data on the blank dot shown in FIG. 20A, the tone value at any pixel position is "33". Consequently, at the pixel position at which the threshold value in the dither matrix M shown in FIG. 20B is smaller than or equal to "32", the blank dot is determined to be ON. The dot arrangement determination unit 1703 applies the processing such as this repeatedly to the whole of the input image data while moving the position in the dither matrix and determines the arrangement of the blank dot in the determined generation amount. FIG. 20C shows an output image as the final quantization results and the black pixel represents ON of the blank dot and the white pixel represents OFF of the blank dot.

As above, it is also possible to implement the quantization processing in the dot arrangement determination unit 1703 by the dither method.

Modification Example

In the present embodiment, explanation is given by taking the case as an example where image formation is performed with a single dot size in the image plane in each ink color, but the present embodiment is not limited to this. It is possible to deal with a plurality of dot sizes by performing distribution again so that the dot arrangement in the dot arrangement data on the actual dots of the single dot size, which is output by the data output unit 1704, changes into the dot arrangement of actual dots of a plurality of dot sizes. As the distribution method, for example, the pixel whose dot is ON in the dot arrangement data on the actual dots of the single dot size is distributed randomly in the image plane for each size of the large, medium, and small dots. Alternatively, it may also be possible to perform distribution by using the error diffusion method or the dither method so that the dispersity becomes good. Further, it may also be possible to perform distribution by taking a predetermined distribution ratio determined in advance as the distribution ratio to a plurality of dot sizes, or it may also be possible to change the distribution ratio in accordance with the dot generation amount of the blank dot. As regards the change in density due to the distribution to a plurality of dot sizes, it is possible to adjust the output density for the input value by performing density correction in the processing unit or the like that performs γ correction, which is included in the image processing unit 110.

In the following, an example of a case is explained where distribution to a plurality of dot sizes is performed in a predetermined ratio based on the dot generation amount of the blank dot by using the dither method. Here, in the output image shown in FIG. 20C, from the position of the white pixel at which the blank dot becomes OFF, the dot arrangement of the actual dots of a plurality of dot sizes is determined. Specifically, at the pixel position at which the threshold value of the dither matrix is greater than or equal to the pixel value of the dot generation amount data P1 on the blank dot, the actual dots of the single dot size are allocated to the actual dots of each dot size. At this time, for example, the dot at the pixel position at which the corresponding threshold value within the dither matrix is greater than or equal to P1 and less than or equal to (128+P1/2) is determined to be the small dot. Then, the dot at the position at which neither blank dot nor small dot is placed (the pixel position at which the corresponding threshold value within the dither matrix is greater than (128+P1/2)) is determined to be the large dot, and so on. By the method such as this, it is possible to apply the present embodiment also to the actual dots of a plurality of dot sizes.

As above, in the present embodiment, the arrangement of the blank dot is determined with priority by the quantization processing and the actual dots for which ink is ejected actually are arranged at the position that is the rest of the position of the arrangement of the blank dot. Due to this, the arrangement of the blank dot is determined with priority over the actual dots, and therefore, it is possible to determine the arrangement of the actual dots in which the dot dispersity of the blank dot is good. In particular, in the dark portion, the paper white is likely to be visually recognized as the blank dot, and therefore, it is possible to keep the higher dispersity in the dark tone. In the present embodiment, the determination of the arrangement is performed for the data on each color of CMYK, but it may also be possible to determine the actual dot arrangement based on the arrangement of the blank dot in a part of the colors, for example, such as only in K with which the blank dot is likely to be conspicuous in the dark tone.

Seventh Embodiment

A printing medium, such as paper, has a limit (hereinafter, called "ink duty limit") to a total amount of ink that can be applied per unit area. In a case where ink is ejected onto a printing medium by an amount exceeding the ink duty limit, the ink is not absorbed by the printing medium and flooding is caused and resulting in the deterioration of the image quality. Because of this, in order to secure the printing quality, it is necessary to suppress the ink application amount to within the range of the ink duty limit. Consequently, an aspect is explained as a seventh embodiment based on the six embodiment, in which the arrangement of the blank dots is determined so as to be highly dispersive by taking into consideration the ink duty limit in accordance with a printing medium.

Figure 21:
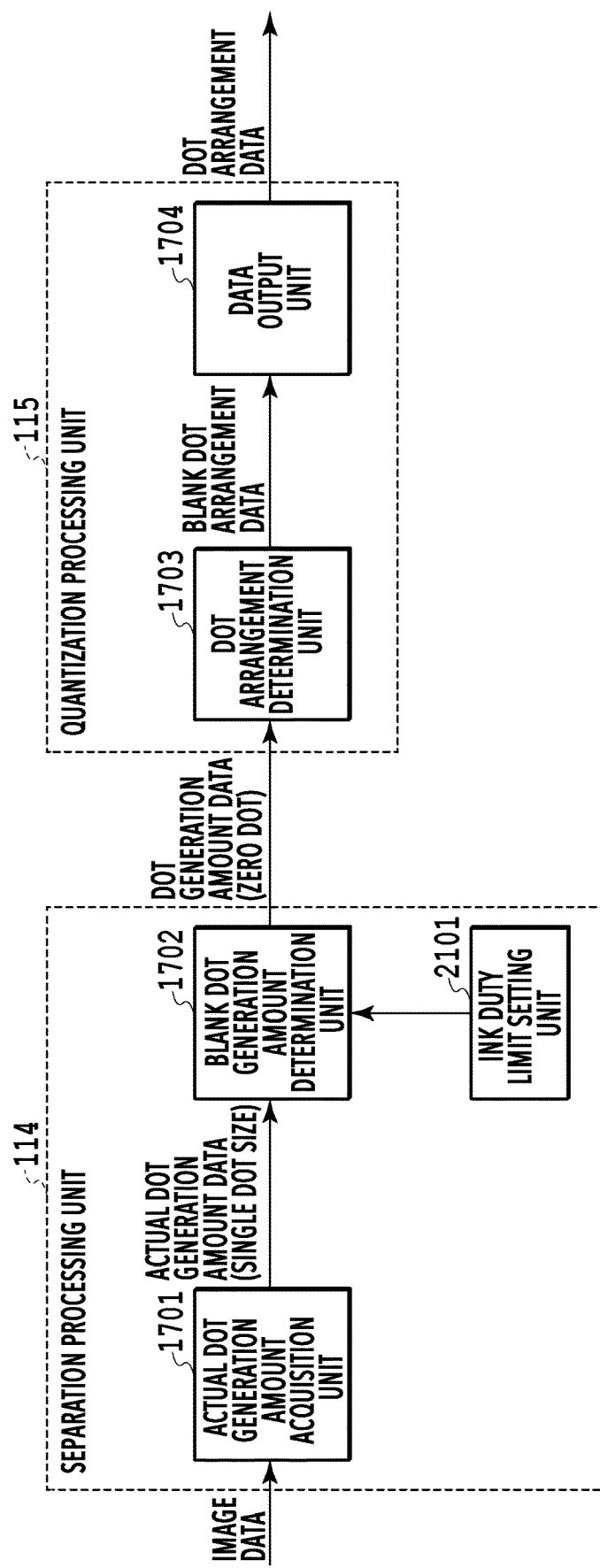
FIG. 21 is a functional block diagram showing an internal configuration of a separation processing unit and a quantization processing unit according to a seventh embodiment.

FIG. 21 is a functional block diagram showing the internal configuration of the separation processing unit 114 and the quantization processing unit 115 according to the present embodiment. As shown in FIG. 21, the separation processing unit 114 of the present embodiment comprises an ink duty limit setting unit 2101, in addition to the actual dot generation amount acquisition unit 1701 and the blank dot generation amount determination unit 1702 shown in FIG. 17 described previously. There is no difference in the internal configuration of the quantization processing unit 115.

The ink duty limit setting unit 2101 sets an ink duty limit in accordance with the kind of printing medium (plain paper, glossy paper, mat paper, and the like) in order to secure printing quality. The setting method is not limited and for example, it may also be possible for a user to set an ink duty limit by specifying an arbitrary value via the operation panel (not shown schematically) in the image forming apparatus 100 or a printer driver installed in an external PC. Further, it may also be possible for a corresponding ink duty limit to be set automatically by storing in advance a table in which a printing medium type to be used and an ink duty limit are associate with each other and by a user specifying a printing medium type.

Figure 22:
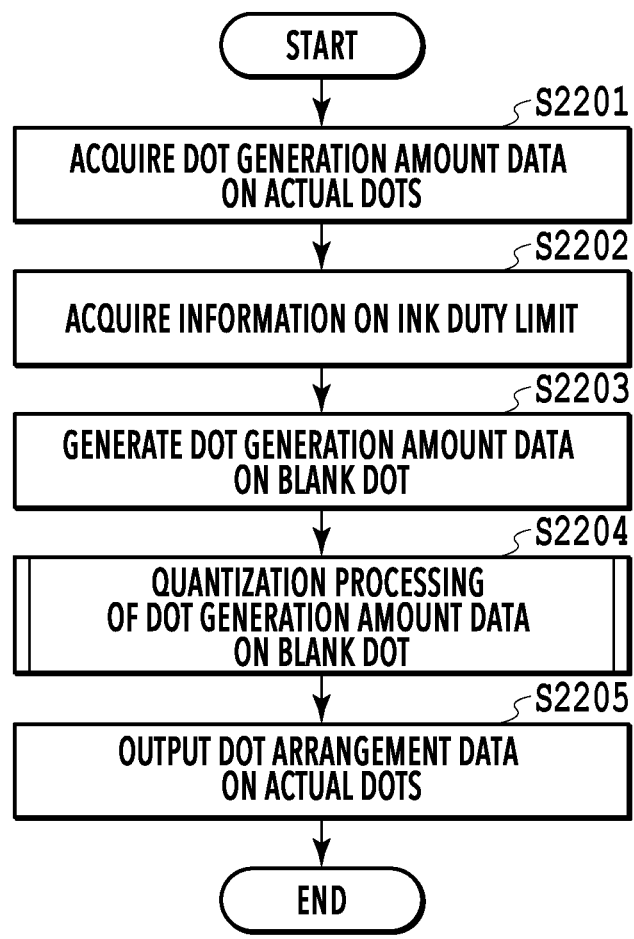
FIG. 22 is a flowchart showing a flow of processing within an image processing unit according to the seventh embodiment.

In the following, along the flowchart shown in FIG. 22, the processing in each unit shown in FIG. 21 is explained in detail. However, explanation is given by omitting or simplifying explanation of the portions in common to those of the flow in FIG. 18 of the sixth embodiment. In the following explanation, symbol "S" represents a step.

At S2201, the actual dot generation amount acquisition unit 1701 acquires dot generation amount data on the actual dots having the same kinds of color, the same number of colors, and the same resolution as those of the ink colors used in the image forming unit 120 from a preprocessing unit, not shown schematically. The subsequent processing is the same for each color of CMYK, and therefore, in the following, explanation is given by taking black (K) as a representative example.

At S2202, the ink duty limit setting unit 2101 sets an ink duty limit corresponding to a printing medium to be used based on user instructions. As described above, the ink duty limit indicates the total amount of ink that can be applied per unit area, which is specified for each printing medium, and it can be said that the ink duty limit represents the maximum value of the dot generation amount of the actual dots.

At S2203, the blank dot generation amount determination unit 1702 determines the dot generation amount data on the blank dot based on the dot generation amount data on the actual dots acquired at S2201 and the ink duty limit set at S2202. Specifically, a value obtained by calculating "255–actual dot generation amount" based on the dot generation amount data on the actual dots and a value obtained by calculating "255–ink duty limit value" based on the maximum value of the dot generation amount of the actual dots, which is indicated by the ink duty limit, are compared for each pixel. Then, the larger value is determined as the dot generation amount of the blank dot. The dot generation amount data on the blank dot thus obtained is sent to the quantization processing unit 115.

At S2203, the dot arrangement determination unit 1703 determines the dot arrangement of the blank dot by performing the same quantization processing as that at S1803 for the blank dot generation amount data. Due to this, the dot arrangement data on the blank dot is obtained, in which ON or OFF of the dot is indicated for each pixel. The dot arrangement data on the blank dot obtained by the quantization processing is sent to the data output unit 1704.

At S2204, the data output unit 1704 outputs the dot arrangement data on the actual dots that can be formed by the line head based on the dot arrangement data on the blank dot received from the dot arrangement determination unit 1703. Specifically, the dot arrangement data on the actual dots is obtained by reversing (changing ON to OFF, OFF to ON) the dot arrangement data on the blank dot for each pixel.

The above is the outline of the processing in the separation processing unit 114 and the quantization processing unit 115 according to the present embodiment. In the method described above, the quantization processing for the blank dot is performed separately, and therefore, the quantization processing is performed one more time corresponding to the one plane. However, by defining the plane whose generation amount is the largest among the dot generation amounts of each dot including the blank dot as a plane whose priority order is the lowest and performing the dot arrangement to the plane last, it is possible to omit the quantization processing for the plane. Consequently, it is also possible to implement the present method, like the conventional method, by n pieces of quantization processing for n plane inputs.

As above, in the present embodiment, the dot generation amount data on the blank dot is determined based on the dot generation amount data on the actual dots and the ink duty limit in accordance with a printing medium. Further, the arrangement of the blank dot is determined with priority by the quantization processing and the actual dots are arranged at the position that is the rest of the position of the arrangement of the blank dot. Due to this, it is possible to determine the dot arrangement of the actual dots in which the dot dispersity of the blank dot is good while securing the printing quality.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the image processing apparatus according to the present invention, it is possible to implement a better granularity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus that generates image data to be output to an image forming apparatus printing an image by an ink dot formed by ejecting ink onto a printing medium, the image processing apparatus comprising:
one or more memories storing instructions;
one or more processors configured to execute the instructions to cause the image processing apparatus to function as:
a generation unit configured to generate, based on an input image, first generation amount data indicating a tone value of each of at least two or more kinds of ink dot corresponding to the ink for each pixel and second generation amount data indicating a tone value of a blank dot for which the ink dot is not formed for each pixel;
a first determination unit configured to determine a blank dot arrangement pattern indicating an arrangement of the blank dot prior to determining an arrangement of the ink dot by using the generated second generation amount data indicating the tone value of the blank dot; and
a second determination unit configured to determine an ink dot arrangement pattern indicating the arrangement of the ink dot by using the determined blank dot arrangement pattern and the first generation amount data so that the ink dot arrangement pattern does not overlap the determined blank dot arrangement pattern on the printing medium.

2. The image processing apparatus according to claim 1, wherein
the generation unit generates the first generation amount data by determining a generation amount of each of the one or more kinds of ink dots in accordance with a tone value of each pixel in the input image.

3. The image processing apparatus according to claim 2, wherein
the image forming apparatus can eject the two or more kinds of ink dot of different sizes for the ink,
the generation unit generates the first generation amount data on each of the two or more kinds of ink dot, and
the first determination unit determines the blank dot arrangement pattern based on the second generation amount data for at least one kind of ink dot of the two or more kinds of ink dot.

4. The image processing apparatus according to claim 1, wherein
a maximum value that can be taken as a pixel value of the first generation amount data and the second generation amount data is the same and
the generation unit calculates a value obtained by subtracting a pixel value of a pixel in the first generation amount data from the maximum value for each pixel as generation amount data of the blank dot.

5. The image processing apparatus according to claim 1, wherein
the second determination unit determines, in a case where a tone value of the input image indicates a dark portion, the ink dot arrangement pattern so as not to overlap the blank dot arrangement pattern.

6. The image processing apparatus according to claim 3, wherein
the second determination unit determines a priority order of dot arrangement for the two or more kinds of ink dot and the blank dot and
the second determination unit determines an arrangement of each dot in accordance with a determined priority order.

7. The image processing apparatus according to claim 6, wherein
the second determination unit determines the priority order for each pixel of the input image.

8. The image processing apparatus according to claim 7, wherein
the two or more kinds of ink dot is classified in accordance with a density level of a tone value in each pixel in the input image and
the second determination unit determines a priority order of dot arrangement for the blank dot to be higher than that of the two or more kinds of ink dot for a pixel belonging to a dark tone among each of the pixels.

9. The image processing apparatus according to claim 8, wherein
the second determination unit determines, in a case where the first generation amount data of a dot whose density level is higher among the two or more kinds of ink dot is larger than or equal to the second generation amount data of the blank dot, the priority order of the blank dot to be higher than that of the two or more kinds of ink dot for each of the pixels.

10. The image processing apparatus according to claim 8, wherein the second determination unit determines, in a case where the first generation amount data of a dot whose density level is higher among the two or more kinds of ink dot is larger than 0, the priority order of dot arrangement for the blank dot to be higher than that of the ink dot for each of the pixels.

11. The image processing apparatus according to claim 6, wherein the second determination unit determines the arrangement of each dot so that the blank dot becomes highly dispersive for a pixel belonging to a dark tone among each pixel of the input image.

12. The image processing apparatus according to claim 6, wherein the second determination unit determines the arrangement of each dot so that the blank dot and a dot whose density level is lower among the two or more kinds of ink dot become highly dispersive in total for a pixel belonging to a dark tone among each pixel of the input image.

13. The image processing apparatus according to claim 6, wherein the two or more kinds of ink dot are classified in accordance with a density level of a tone value in each pixel of an input image and formed for each color of a plurality of color materials and the second determination unit determines the priority order for each image plane corresponding to the plurality of color materials.

14. The image processing apparatus according to claim 13, wherein the second determination unit:
determines a priority order of dot arrangement for the blank dot to be higher than that of a dot whose density level is higher among the two or more kinds of ink dot in a case where importance is attached to granularity in an image represented by the two or more kinds of ink dot; and
determines a priority order of dot arrangement for a dot whose density level is higher among the two or more kinds of ink dot to be higher than that of the blank dot in a case where importance is attached to suppression of streaking in the image represented by the two or more kinds of ink dot.

15. The image processing apparatus according to claim 3, wherein the generation unit generates the first generation amount data on the two or more kinds of ink dot by using a separation table describing the first generation amount data for each tone of each of the two or more kinds of ink dot.

16. The image processing apparatus according to claim 1, wherein the generation unit generates generation amount data on the one or more kinds of ink dot and the blank dot by using a separation table describing a generation amount for each tone of each of the one or more kinds of ink dot and the blank dot.

17. The image processing apparatus according to claim 1, wherein the second determination unit determines dot arrange of one kind of ink dot among the two or more kinds of ink dot so that the dot arrange of one kind of ink is located in a rest position of the blank dot and the other dot.

18. The image processing apparatus according to claim 1, further comprising:

a third determination unit configured to determine whether the tone value of each of the at least two or more kinds of ink dot indicates light tone or dark tone,
wherein the second determination unit determines, in case where the tone value of each of the at least two or more kinds of ink dot indicates dark tone, the ink dot arrangement pattern so as not to overlap the determined blank dot arrangement pattern on the printing medium, and determines, in case where the tone value of each of the at least two or more kinds of ink dot indicates light tone, the ink dot arrangement pattern so as to overlap the determined blank dot arrangement pattern on the printing medium.

19. The image processing apparatus according to claim 1, wherein the generation unit further comprising:

a calculation unit configured to calculate a correction amount for the first generation amount data based on the second generation amount data; and
a correction unit configured to correct the first generation amount data using the calculated correction amount.

20. A method of generating image data to be output to an image forming apparatus printing an image by an ink dot formed by ejecting ink onto a printing medium, the method comprising:

generating, based on an input image, first generation amount data indicating a tone value of each of at least two or more kinds of ink dot corresponding to the ink for each pixel and second generation amount data indicating a tone value of a blank dot for which the ink dot is not formed for each pixel;
determining a blank dot arrangement pattern indicating an arrangement of the blank dot prior to determining an arrangement of the ink dot by using the generated second generation amount data indicating the tone value of the blank dot; and
determining an ink dot arrangement pattern indicating the arrangement of the ink dot by using the determined blank dot arrangement pattern and the first generation amount data so that the ink dot arrangement pattern is determined so as does not to overlap the determined blank dot arrangement pattern on the printing medium.

21. A non-transitory computer-readable storage medium storing a program for causing a computer to perform a method of generating image data to be output to an image forming apparatus printing an image by an ink dot formed by ejecting ink onto a printing medium, the method comprising:

generating, based on an input image, first generation amount data indicating a tone value of each of at least two or more kinds of ink dot corresponding to the ink for each pixel and second generation amount data indicating a tone value of a blank dot for which the ink dot is not formed for each pixel;
determining a blank dot arrangement pattern indicating an arrangement of the blank dot prior to determining an arrangement of the ink dot by using the generated second generation amount data indicating the tone value of the blank dot; and determining an ink dot arrangement pattern indicating the arrangement of the ink dot by using the determined blank dot arrangement pattern and the first generation amount data so that the ink dot arrangement pattern does not to overlap the determined blank dot arrangement pattern on the printing medium.

\* \* \* \* \*